United States Patent [19]

Fowler et al.

[11] Patent Number: 5,263,662
[45] Date of Patent: Nov. 23, 1993

[54] HELICOPTER INTEGRATED FIRE AND FLIGHT CONTROL SYSTEM HAVING TURN COORDINATION CONTROL

[75] Inventors: Donald W. Fowler, Oxford; Nicholas D. Lappos, Milford, both of Conn.

[73] Assignee: United Technologies Corporation, Hartford, Conn.

[21] Appl. No.: 885,798

[22] Filed: May 19, 1992

[51] Int. Cl.$^5$ .................................................. B64C 11/34
[52] U.S. Cl. ................... 244/17.13; 244/75 R; 89/41.21
[58] Field of Search ............... 244/17.13, 75 R, 76 R, 244/221; 89/41.21; 364/423, 424.01, 434

[56] References Cited

U.S. PATENT DOCUMENTS

| | | | |
|---|---|---|---|
| 4,067,517 | 1/1978 | Barnum | 244/17.13 |
| 4,206,891 | 6/1980 | Perez et al. | 244/17.13 |
| 4,528,891 | 7/1985 | Brunello et al. | 89/41.21 |

FOREIGN PATENT DOCUMENTS 0693058  8/1964  Canada ................. 89/41.21

OTHER PUBLICATIONS

McDonnell Douglas Helicopter Company, Integrated Air-to-Air Weapon (INTAAW) Evaluation System Definition Report, Final Issue, 23 Jan. 1990, pp. 6–1 to 6–31.

"A Simulator Investigation of Parameters Affecting Helicopter Handling Qualities in Air Combat (HAC II)", pp. 1–18, by Michael S. Lewis and M. Hossein Mansur, Aerospace Engineers, Ames Research Center; and Robert T. M. Chen, NASA Ames Research Center.
IFEE AES Systems Magazine, Jan. 1992, "Integrated Flight/Fire Control for Attack Helicopters", pp. 17–23, by Stephen Osder of McDonnell Douglas Helicopter Company.
Chief Engineer, vol. 6, No. 4, Jul.–Aug. 1983, "Design and Analysis of a Digitally Controlled Integrated Flight/Fire Control System", pp. 251–257, by John H. Blakelock, Applications Research Corporation.

Primary Examiner—Margaret A. Focarin
Assistant Examiner—Christopher P. Ellis
Attorney, Agent, or Firm—Michael Grillo

[57] ABSTRACT

During operation of a flight control system in a coupled aiming mode, wherein a fire control system (55) azimuth command and elevation command provide an aircraft attitude reference, a bank angle calculation function (1077) provides a bank angle signal to place the aircraft in a roll angle which results in a substantially coordinated turn. The bank angle signal is determined primarily as a function of an aiming line of sight heading rate for small azimuth commands, and is determined primarily as a function of aircraft heading rate for large azimuth commands. Additionally, the bank angle initially comprises a component as a function of aircraft lateral acceleration for driving aircraft lateral acceleration to zero, and after the aircraft assumes a roll attitude for turn coordination, the bank angle comprises a component as a function of aircraft side slip for driving aircraft side slip to zero. Automatic turn coordination is disabled if the pilot maneuvers the aircraft to avoid a coordinated turn, and is re-enabled if the pilot maneuvers the aircraft into a coordinated turn attitude.

A rate feedback path (143) is provided during operation in the coupled aiming mode wherein aircraft yaw and pitch rate error signals are respectively replaced by the rate of change of the azimuth command and the elevation command. During operation in the coupled aiming mode, intended pilot commanded maneuvers maintain full authority at all times.

13 Claims, 12 Drawing Sheets

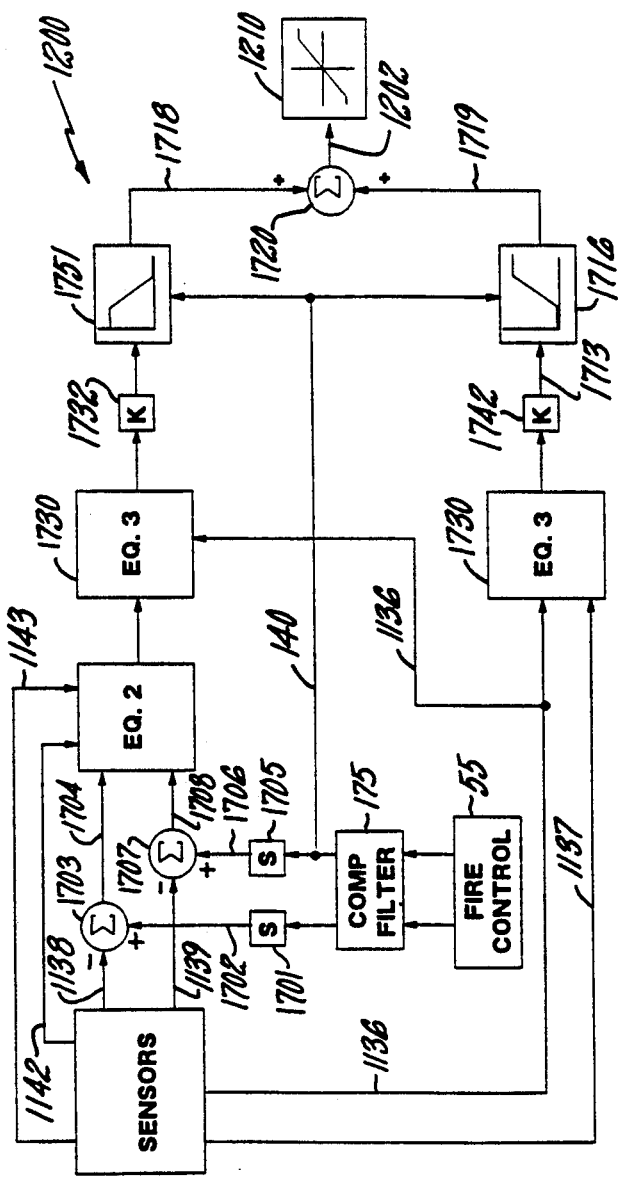
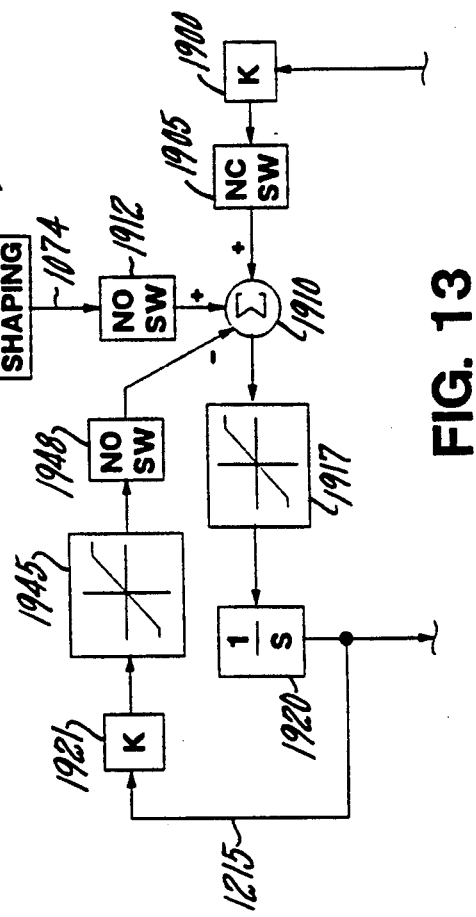
FIG. 11
FIG. 13 ated fire and flight control system which provides automatic turn coordination during control of aircraft azimuth and pitch based on a fire control system targeting solution.

HELICOPTER INTEGRATED FIRE AND FLIGHT CONTROL SYSTEM HAVING TURN COORDINATION CONTROL

DESCRIPTION

TECHNICAL FIELD

The present invention relates to flight control systems for rotary wing aircraft and more particularly to an integrated fire and flight control system which provides automatic turn coordination during control of aircraft azimuth and pitch based on a fire control system targeting solution.

BACKGROUND OF THE INVENTION

The combat uses for helicopter aircraft have changed dramatically over the years to include contact with opposing forces, including reconnaissance and combat aircraft assistance of troops on the front line. This type of use subjects helicopters to numerous threats, and therefore new helicopter designs incorporate offensive weapons, such as Gatling guns and rocket launchers.

Initially, the primary control of helicopter weapons was accomplished by the pilot aiming the aircraft at the target prior to firing. Correction for misses was accomplished by the pilot adjusting the attitude of the aircraft prior to expending additional ordnance. As technology developed, tracking and sensing systems were used to locate the target and determine the aircraft attitude necessary to aim the weapon so as to account for outside forces acting on the ordnance, e.g., wind, aircraft speed, etc. Such a system typically displays a "cross-hair" indicative of actual aircraft attitude and a geometric shape indicative of the required aircraft attitude to provide a high probability of striking the target with the weapon. The pilot is required to maneuver the aircraft so as to place the cross-hair in the firing solution defined by the shape prior to firing the weapon. The aiming instructions e.g., cross-hair and geometric shape, are typically displayed on a control panel, a heads-up display, or helmet-mounted display which provides the pilot with visual information relating to the target position, ownship attitude, heading, speed and altitude.

Although such aiming systems improved weapons delivery accuracy, the pilot is still under a significant burden to regulate aircraft heading and pitch attitude. It is well-known that a skilled helicopter pilot can control aircraft attitude within about 1 degree of pitch and yaw. Although this may seem very accurate control, a 1 degree variation in pitch or yaw will have a significant effect on the trajectory of a projectile.

When the pilot is maneuvering the aircraft for targeting, the aircraft automatic flight control system (AFCS) will typically provide control signals such that the aircraft executes coordinated turns. A coordinated turn for a rotary wing aircraft, i.e., a helicopter having a single main rotor, is defined as a banked turn where the body of the aircraft is tangential to a curvilinear flight path of the aircraft, i.e., no side-slip vectors. Control of yaw axis commands to the tail rotor is critical in this type of maneuver.

In mechanical linkage control systems a coordinated turn requires that the pilot simultaneously input, via rudder pedals, the proper amount of yaw to match the amount of roll input provided via the cyclic stick. The more recent fly-by-wire flight control systems (see e.g., U.S. Pat. Nos. 4,203,532, 4,067,517, 4,206,891 and 4,484,283, all assigned to the assignee of the present invention) automatically provide the matching yaw input. The AFCS commands a coordinated yaw input, typically at air speeds above 60 knots, based on the sensed rate of the yaw rate gyro. The coordinated yaw signal is then used to modify the main and tail rotor command signals as necessary to drive the helicopter's lateral acceleration to zero.

DISCLOSURE OF THE INVENTION

Objects of the invention include provision of an improved flight control system for a rotary wing aircraft, integrated with an aircraft fire control system, which commands a bank angle for providing automatic turn coordination control when a fire control solution is used to control the aircraft yaw attitude and pitch attitude during weapons targeting.

A further object of the present invention is to provide an integrated fire and flight control system having automatic turn coordination control when using a fire control solution to control aircraft yaw attitude and pitch attitude only when aircraft speed is above a threshold magnitude, and which maintains pilot command authority to override automatic turn coordination.

According to the present invention, during operation in a coupled aiming mode wherein a fire control solution azimuth command and elevation command respectively replace the flight control system yaw attitude feedback error signal and pitch attitude feedback error signal as the aircraft attitude reference, an IFFC roll command is provided as a function of heading rate, air speed, and the inertial rate of rotation of the aiming line of sight, replacing the flight control system roll attitude feedback error signal.

In further accord with the present invention, the IFFC roll command includes a bank angle component which is a function of either lateral acceleration or side slip.

In still further accord with the present invention, automatic turn coordination control is provided during integration of the fire control system with the flight control system only while the pilot manually depresses and holds an enable switch and air speed is above a threshold level, and during integration of the fire control system and the flight control system, the pilot stick control path remains the primary input to the flight control system to thereby provide override capability for pilot commanded roll maneuvers. Automatic turn coordination is disabled if the pilot maneuvers the aircraft to avoid a coordinated turn, and is reenabled if the pilot maneuvers the aircraft into a coordinated turn attitude.

In further accord with the present invention, during operation in the coupled aiming mode, the rate of change of the fire control solution azimuth command and elevation command respectively replace the aircraft yaw rate and pitch rate as the aircraft rate reference in a rate feedback path.

The present invention reduces pilot workload during weapons aiming and improves overall weapons effectiveness by providing automatic turn coordination when using a fire control solution to automatically provide a commanded pitch and yaw attitude reference. The automatic turn coordination of the present invention provides the necessary bank angle for the aircraft to perform a coordinated turn, and therefore does not change the yaw attitude required for the firing solution. Turn coordination is disabled if the pilot maneuvers the aircraft in a manner opposing turn coordination, and therefore the pilot may override the turn coordination at any time. The pilot commanded stick input maintains primary authority, and therefore the pilot is capable of fully exercising the aircraft's inherent agility for evasive maneuvers, to break lock from enemy targeting systems or to engage new threats.

The present invention further attempts to drive the aiming rate error to zero to improve the accuracy of weapons targeting. The fire control solution azimuth and elevation aiming rate provide the aircraft rate reference in a rate feedback path during operation in the coupled aiming mode. Therefore, the aircraft attitude rapidly assumes the proper attitude for weapons targeting, and the accuracy of weapons targeting is improved.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

FIG. 11 is a schematic block diagram of a roll attitude function of the bank angle calculation portion of FIG. 10;

FIG. 13 is a schematic block diagram of a feedback path of the bank angle calculation portion of FIG. 10; and logic for controlling the operation of a roll transient free switch.

BEST MODE FOR CARRYING OUT THE INVENTION

The integrated fire and flight control (IFFC) system of the present invention is particularly well suited for aiding a helicopter pilot in the target acquisition phase of the mission, and for improving the overall weapons effectiveness by increasing ordnance delivery accuracy.

When a pilot has engaged a target, and an aircraft fire control system is activated and a weapon is selected, current fire control systems employ symbology to direct the pilot on the proper aircraft attitude required to deliver the selected ordnance at the target location. A cross-hair is displayed which symbolizes the aircraft's current attitude, and a geometric shape, e.g., a diamond, box, ellipse, circle, etc., is displayed which represents the acceptable firing solution. The pilot then attempts to maneuver the aircraft so that the cross-hair appears within the geometric shape to achieve a successful weapons delivery event. When maneuvering the aircraft, the AFCS will command a coordinated yaw input if the pilot commands a roll input, thereby providing a coordinated turn. For certain ordnance, the pilot is required to achieve and maintain a very accurate aircraft attitude for a successful weapons delivery. This places a significant burden on the pilot to regulate heading and pitch angle.

Figure 1:
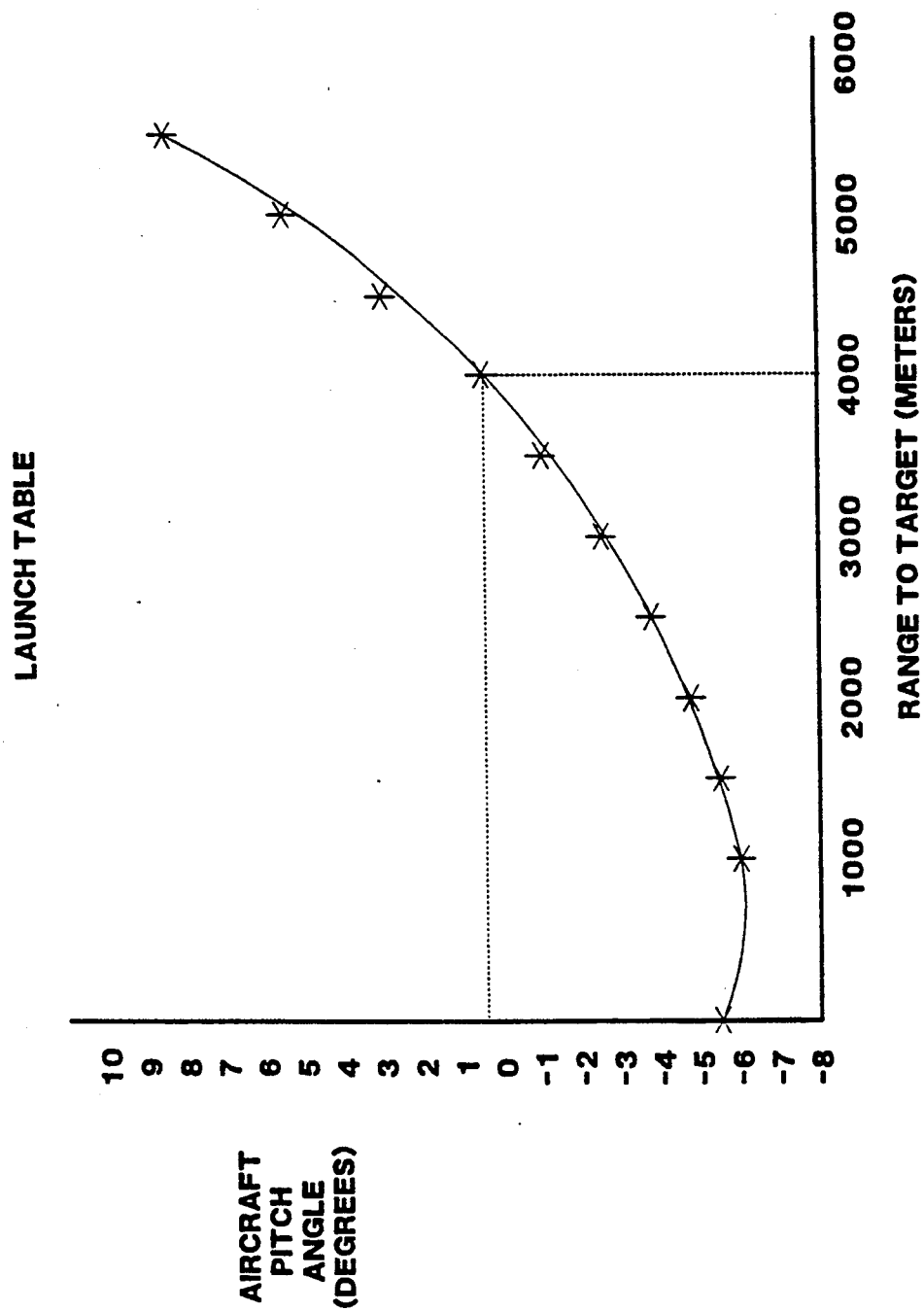
FIG. 1 is a graph showing the relationship between aircraft pitch angle and ordnance range for a Mark 40 2.75 inch folding fin aerial rocket having a ten-pound warhead.

Referring to FIG. 1, a launch table shows the relationship between aircraft pitch angle and ordnance delivery range for a Mark 40, 2.75 inch, folding fin aerial rocket having a ten-pound warhead. For example, the pilot is required is achieve a ¼ degree pitch angle to deliver the ordnance at a range of 4,000 meters. This graph assumes that the aircraft and the target are at the same altitude. Further adjustments are required if the target is at a different altitude from the aircraft.

Figure 2:
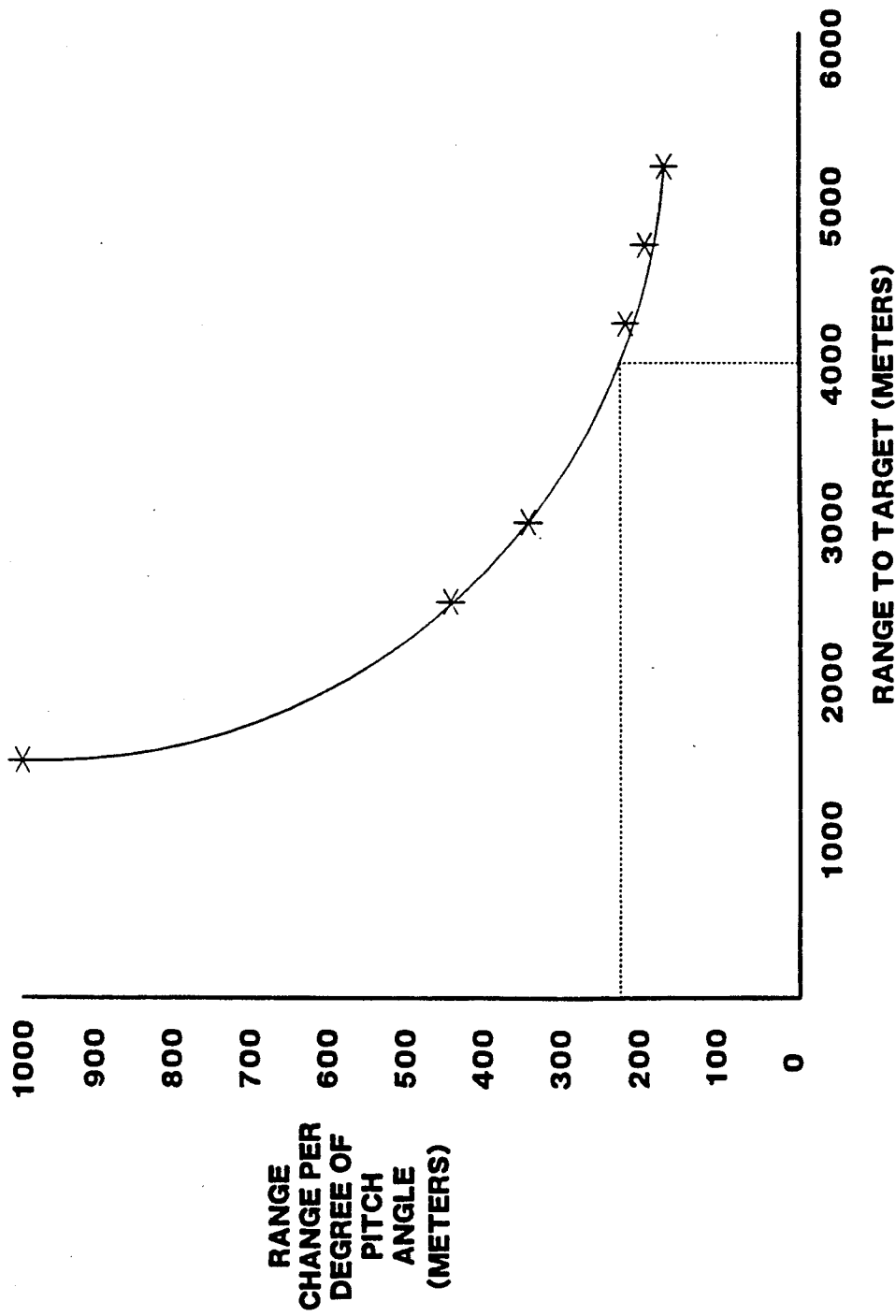
FIG. 2 is a graph showing the relationship between the change in ordnance delivery range per degree of pitch angle and the range to the target for the Mark 40 rocket of FIG. 1.
Figure 3:
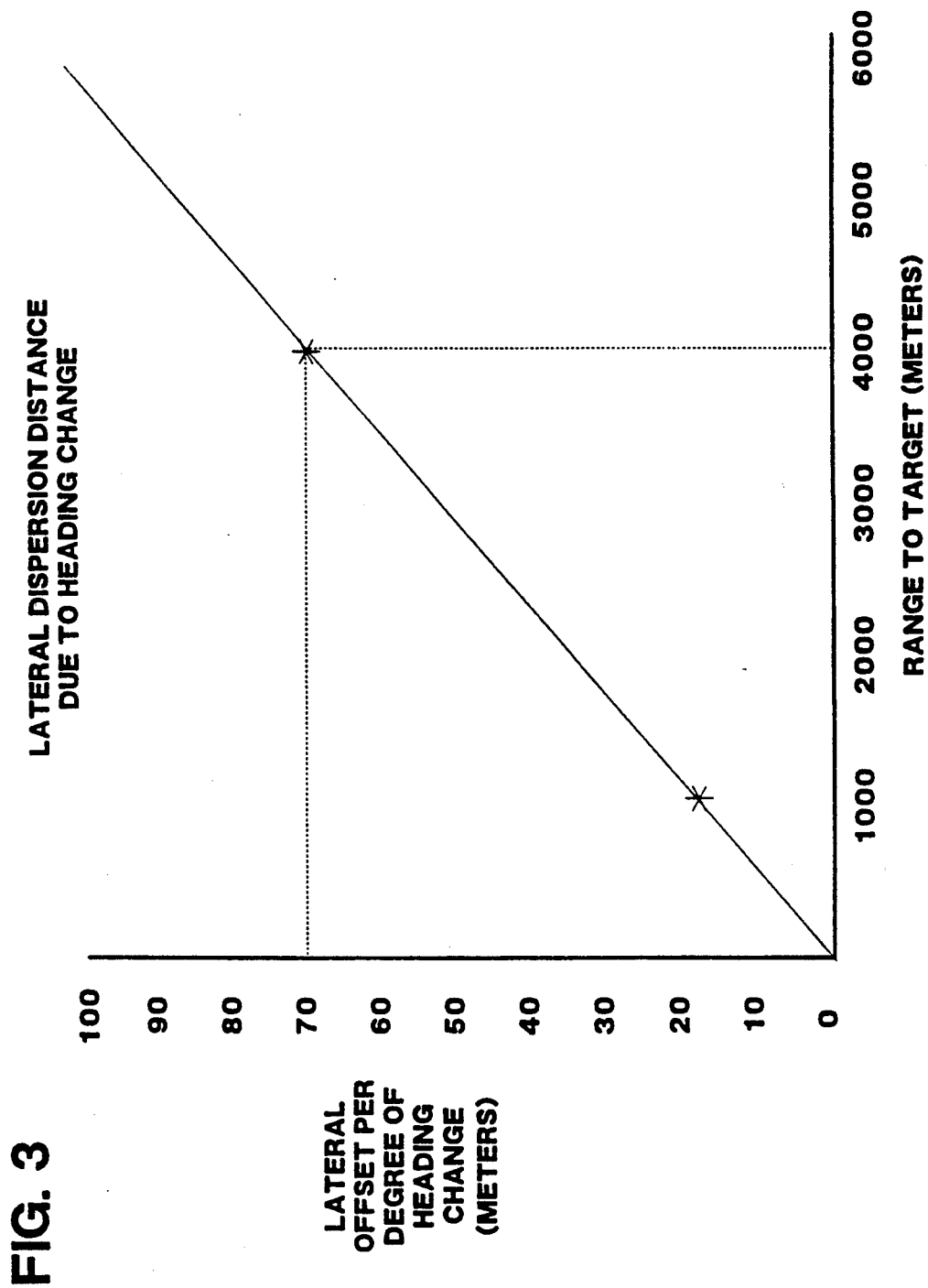
FIG. 3 is a graph showing the relationship between the lateral offset per degree of heading change and the range to the target for the Mark 40 rocket of FIG. 1.

It is well-known that a skilled pilot is able to control pitch and yaw attitude within about ±1 degree. FIG. 2 illustrates the variations in impact point caused by a 1 degree change in pitch angle depending on the range to the target. For example, at a 4,000 meter range, a 1 degree pitch angle change will move the impact point by approximately 250 meters. FIG. 3 illustrates the variation in impact point per degree of heading change for targets at various ranges. For example, at a 4,000 meter range, a 1 degree heading change will offset the impact point by approximately 70 meters. It will therefore be understood that to achieve a high probability of impact, the pilot is required to expend numerous ordnance to increase the probability of a successful impact.

The integrated fire and flight control system of the present invention improves the accuracy of aiming pitch and yaw attitude to within about ±1 degree of the fire control system firing solution. The system greatly enhances the accuracy of weapons delivery, while reducing the pilot workload during weapons delivery. Additionally, the pilot is required to expend much less ordnance in order to achieve a suitable probability of impacting the target.

Figure 4:
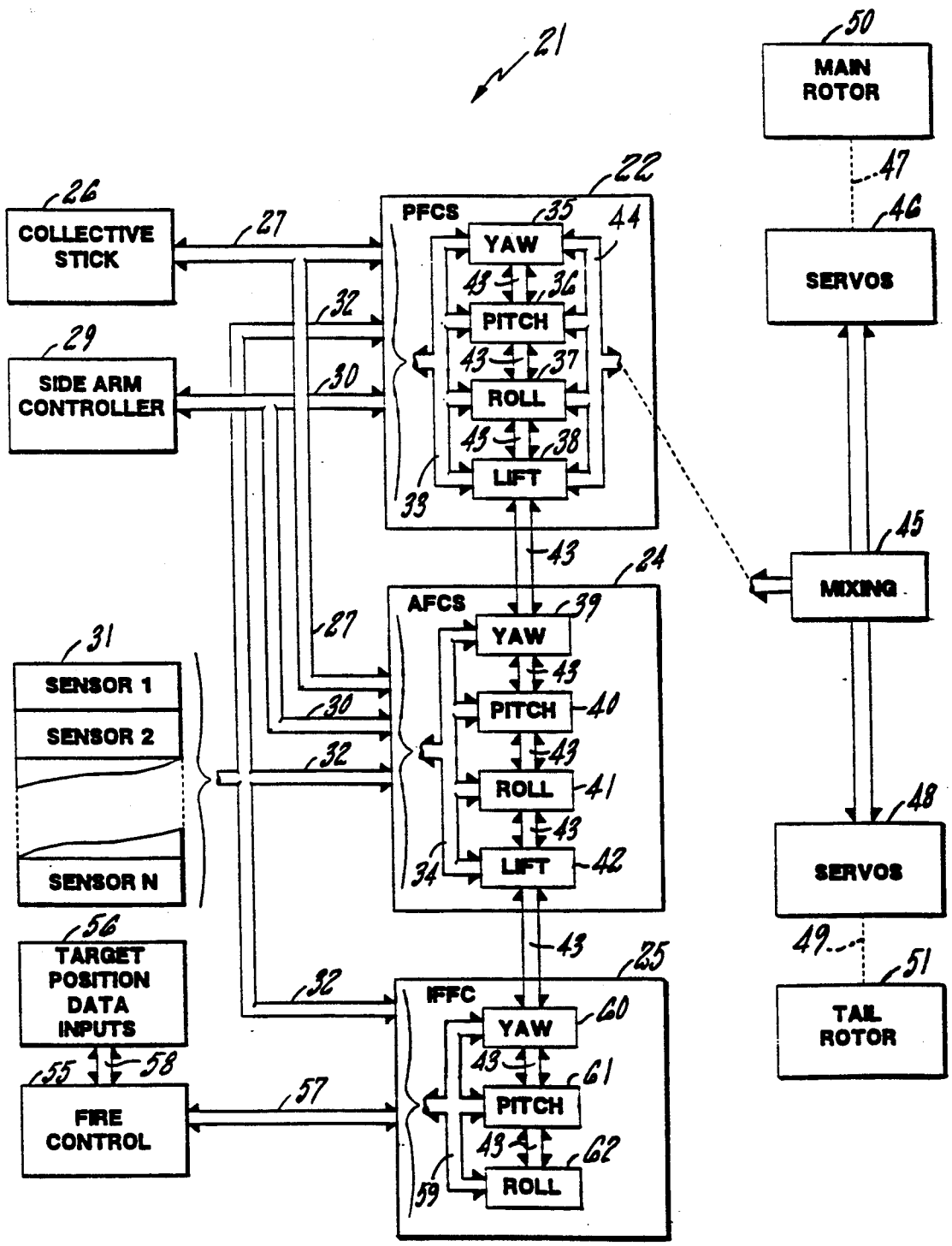
FIG. 4 is a block diagram of the integrated fire and flight control system of the present invention.

Referring now to FIG. 4, the system of the present invention 21 includes a primary flight control system (PFCS) 22, an automatic flight control system (AFCS) 24 and an integrated fire and flight control system (IFFC) 25. The PFCS receives displacement command output signals from a displacement collective stick 26 on lines 27. The AFCS also receives collective stick discrete output signals on the lines 27. The PFCS and AFCS each receive the force output command signals of a four-axis sidearm controller 29 on lines 30. The AFCS and PFCS also receive sensed parameter signals from sensors 31 on lines 32. The pilot command signals on lines 27 and 30 and the sensed parameter signals on lines 32 are shown consolidated within trunk lines 33 and 34 in the PFCS and AFCS, respectively.

The PFCS and AFCS each contain control modules for controlling the yaw, pitch, roll and lift axes of the aircraft. These modules are shown by blocks 35-38 for the PFCS and blocks 39-42 for the AFCS. The PFCS modules provide rotor command signals, and the AFCS modules provide conditioning and/or trimming of the PFCS rotor command signals. The PFCS and AFCS modules are interconnected through bus 43.

The PFCS and AFCS use a model following algorithm in each control axis to provide rotor command signals on output lines 44 to a rotor mixing function 45 which commands displacement of mechanical servos 46 and linkages 47 to control the tip path plane of a main rotor 50. Additionally, the rotor mixing function 45 controls tail rotor servos 48 which control the thrust of a tail rotor 51 through linkages 49. The sensed parameter signals from sensors 31, on lines 32, provide the PFCS and AFCS with the aircraft's angular rate and attitude response to the main rotor and tail rotor command signals. Additionally, the sensors provide information related to velocity, altitude, acceleration, etc., which information may or may not be used by the flight control system.

The IFFC 25 receives fire control data from a fire control system 55 on lines 57. The IFFC also receives sensed parameter signals on lines 32 from sensors 31. Target position data is provided to the fire control 55 from target position/angle data inputs 56 on lines 58. The target position/angle data may be provided from a variety of sources as is well-known in the art, e.g., line of sight angle sensors, map and position data, infrared sensors, laser sensors, radar sensors, etc. The fire control data on lines 57 and sensed parameter signals on lines 32 are shown consolidated within trunk lines 59 in the IFFC.

The IFFC contains control channel modules for providing yaw, pitch and roll control signals to the AFCS. These modules are shown by blocks 60, 61 and 62, respectively. The IFFC modules are interconnected to the PFCS and AFCS modules through the bus 43. As described in greater detail hereinafter, when the fire control solution azimuth and elevation commands are within a threshold limit, the AFCS yaw and pitch axis attitude feedback error signals are replaced with the fire control azimuth and elevation axis commands, respectively. Normally, in response to pilot commands, the AFCS provides the desired yaw and pitch attitude reference. The difference between these attitude reference commands and actual aircraft attitude is attitude feedback error signals which the AFCS continuously attempts to reduce to zero. When certain weapons are selected, e.g., a fixed forward gun or a rocket having a fixed pod, and IFFC is enabled, then the fire control azimuth and elevation commands are used as the respective attitude feedback error signals. This is referred to as the "coupled aiming" mode of operation. IFFC may be enabled by the pilot depressing a switch on the sidearm controller 29, or additional logic may be provided (FIG. 8) which requires that the target be within an engagement window and the fire control system is providing valid fire control commands.

Figure 5:
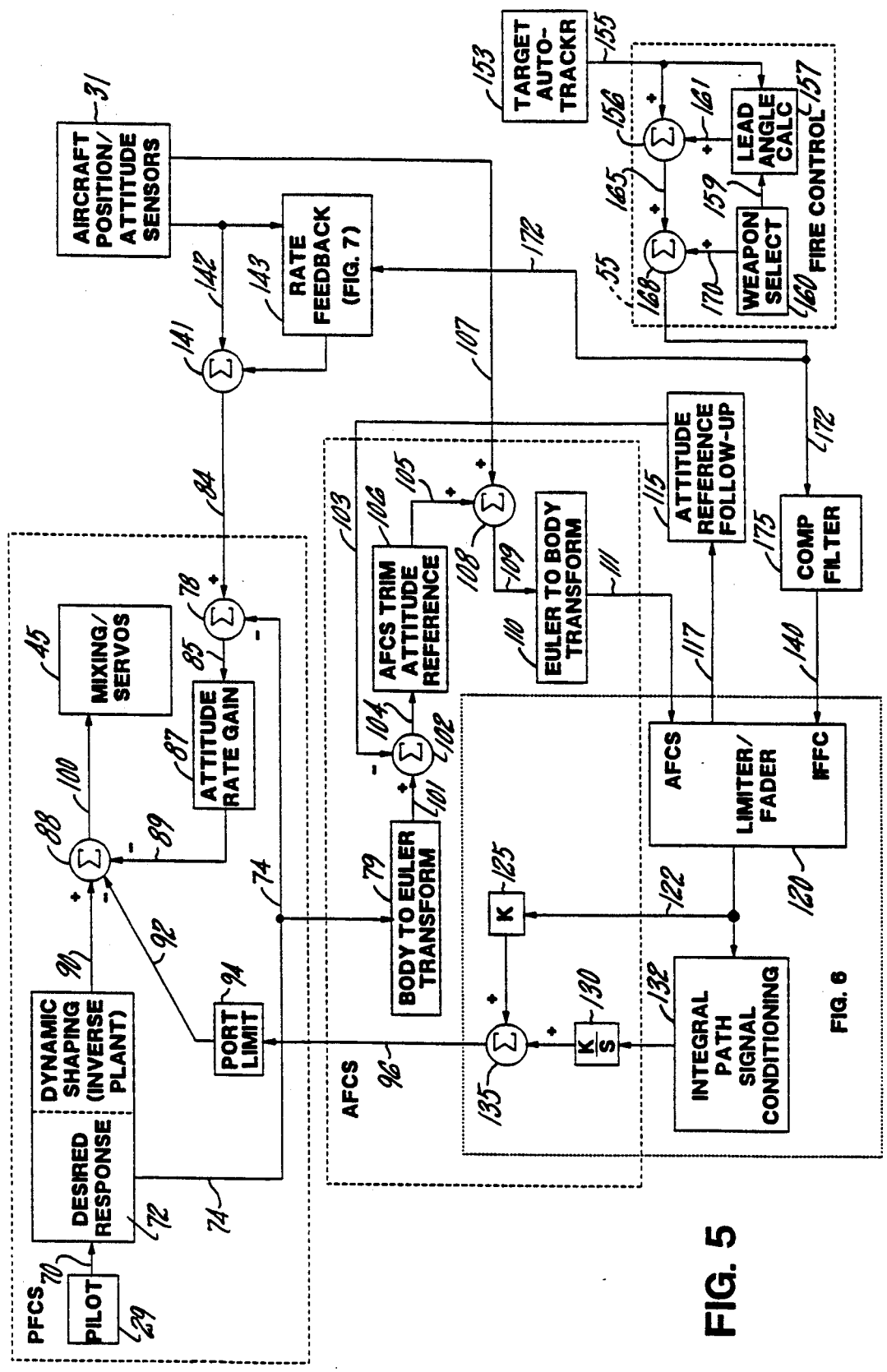
FIG. 5 is a simplified schematic block diagram of a yaw/pitch attitude control portion of the integrated fire and flight control system of FIG. 4.

FIG. 5 illustrates the functional interconnection of the IFFC yaw and pitch modules 60, 61 with the PFCS 22 and the AFCS 24. FIG. 5 will be described with respect to the yaw axis modules 35, 39, 60, e.g., flight control yaw attitude reference and fire control azimuth command signals; however, it will be understood by those skilled in the art that the functional interconnection of FIG. 5 is equally applicable to flight control pitch attitude reference and fire control elevation command signals.

The PFCS receives a yaw axis command signal on line 70, provided through trunk lines 33 and lines 30, from the sidearm controller 29 (FIG. 4). In the present embodiment, the sidearm controller is a four-axis force stick in which yaw axis command signals are generated by the pilot's lateral twisting (left or right) of the sidearm controller, and in which pitch axis command signals are generated by the pilot's pushing and pulling (front or back) of the sidearm controller. The yaw command signal is presented to the input of signal shaping circuitry 72. The signal shaping circuitry comprises a desired rate response section that provides a commanded yaw rate signal on a line 74 indicative of the desired rate of change of the aircraft attitude about the yaw axis. Additionally, the signal shaping circuitry 72 comprises a dynamic shaping section which is an inverse model of the approximate plant yaw axis response that provides a control command signal on a line 90. The control command signal on the line 90 represents the approximate rotor command necessary to achieve the desired yaw-axis rate of change of the aircraft for each pilot commanded maneuver, and provides the primary control input to the rotor mixing function 45.

The commanded yaw rate signal on line 74 is presented simultaneously to a summing junction 78 in the PFCS, and a Body to Euler Transformation 79 in the AFCS. During normal operations, the summing junction 78 sums the commanded yaw rate signal on line 74 (from the signal shaping circuitry 72) with the aircraft's actual yaw rate, received (from sensors 31, through lines 32 and trunk 33) as a sensed yaw rate signal on line 84 via summing junction 141 and line 142. However, during operation in the coupled aiming mode, the attitude rate signal is modified by an aiming line of sight rate signal provided by a rate feedback path 143 as will be described with respect to FIG. 7. The output of the summing junction 78 is a yaw rate error signal on a line 85. The rate error signal is amplified in a rate gain stage 87 and is provided on a line 89 to one input of a second PFCS summing junction 88. The summing junction 88 also receives the control command signal on line 90 from the signal shaping circuitry 72, and a yaw command modifying signal on a line 92 from a rate and magnitude limiter 94. The limiter 94, which receives a non-limited version of the yaw command modifying signal on a line 96 (through bus 43) from the AFCS, limits the yaw command modifying signal if its magnitude and rate of change limits are exceeded. The output of the summing junction 88 is provided on a line 100, and presented through the PFCS output trunk lines 44 to the mixing function 45.

The magnitude and rate of change of the yaw command modifying signal from the AFCS is a function of the aircraft heading error during normal operations. The yaw command modifying signal provides an aircraft attitude feedback loop around the rotor command signal. The attitude feedback loop is the second of two feedback loops around the rotor command signal; the first being a yaw rate feedback loop provided by the yaw rate error signal on line 89.

The yaw command modifying signal is a calculated value provided by a model following algorithm within the AFCS, based on the actual aircraft response to the rotor command signal. The yaw command modifying signal modifies the rotor command signal to achieve the pilot commanded yaw attitude. A more detailed description of the model following algorithms of the AFCS, and AFCS architecture, is given in commonly owned copending U.S. patent application No. 07/751,431, entitled "High Speed Turn Coordination For A Rotary Wing Aircraft", the disclosure of which is incorporated herein by reference.

A yaw attitude feedback error signal is normally used to provide the yaw command modifying signal. However, during operation of the IFFC in the coupled aiming mode, the fire control system azimuth command is used to provide the yaw command modifying signal. The attitude feedback error signal is developed in the AFCS. The commanded yaw rate signal is provided on the line 74 to the Body to Euler Transformation 79. The Transformation 79 transforms the yaw rate signal, which is in terms of aircraft body axes, to an inertial axes reference on a line 101, which is provided to a summing junction 102. The other input to the summing junction 102 is an attitude reference follow-up error signal on a line 103. The output of the summing junction 102 is provided on a line 104 to an AFCS trim attitude reference function 106. The reference function 106 is an integral function which converts the commanded yaw rate signal (in terms of inertial axes on the line 101) to a commanded yaw attitude signal on a line 105. The commanded yaw attitude signal is provided to a summing junction 108, the other input of which is a yaw attitude signal on a line 107, provided from sensors 31, through lines 32 and trunk 34 (FIG. 4). The output of the summing junction 108 is the yaw attitude feedback error signal on a line 109 in terms of inertial axes, and is the difference between the commanded yaw attitude on the line 105 and the actual aircraft yaw attitude on the line 107. The yaw attitude feedback error signal is provided to a Euler to Body Transform 110 which transforms the yaw attitude feedback error signal from an inertial axes reference back to an aircraft body axes reference on a line 111. The operation of both Transform functions 79, 110 are described in greater detail in the aforementioned commonly owned copending U.S. patent application No. 07/751,431, the disclosure of which is incorporated herein by reference.

During operation of the system in the coupled aiming mode, the yaw attitude feedback error signal is replaced by the fire control azimuth command signal. Therefore, there will be a difference between the yaw attitude reference as indicated by the AFCS and the feedback error signal was not used to provide the yaw command modifying signal. Therefore, the attitude reference follow-up error signal is provided on the line 103 to the summing junction 102 to modify the rate signal on the line 104. The attitude rate follow-up error signal is provided by an attitude follow-up portion 115 of the IFFC. The attitude follow-up portion receives an attitude follow-up error signal on a line 117, and converts it to an attitude reference follow-up error signal.

The yaw attitude feedback error signal on the line 111 is applied to a limiter/fader portion 120 of the IFFC. During normal operations, the limiter/fader portion 120 passes the yaw attitude feedback error signal to the line 122, where the yaw attitude feedback error signal is applied via a proportional path containing a gain function 125 to a summing junction 135. The yaw attitude feedback signal is also applied to the summing junction 135 via an integral path containing a signal selection/conditioning function 132 and an integral function 130. During normal operations, the signal selection/conditioning function 132 simply provides the yaw attitude feedback error signal to the integral function 130. The output of the summing junction 135 is the yaw command modifying signal on the line 96.

During operation of the system in the coupled aiming mode, the limiter/fader portion 120 of the IFFC replaces the yaw attitude feedback error signal on the line 122 with an IFFC azimuth command signal on a line 140. Additionally, the signal selection/conditioning function 132 modifies the IFFC azimuth command signal when the couple aiming mode is enabled as described in greater detail hereinafter with respect to FIG. 6.

The IFFC azimuth command signal is provided by the aircraft fire control system. Normally, when a specific threat/enemy platform is selected as the target for use in the coupled aiming mode, target azimuth and elevation information is provide on a line 155 by a target autotracker 153, e.g., an electro-optical tracking device or a radar. The azimuth and elevation information provided by the autotracker 153 is a line of sight vector between the target and an arbitrary point on the aircraft body used for line of sight calculations, e.g., an aircraft reference axis. The line of sight vector is resolved into an elevation component and an azimuth component. The output of the autotracker function 153 is provided on the line 155 to a summing junction 156 and to a lead angle calculation function 157. The other input to the lead angle calculation function 157 is a weapons type signal on a line 159 from a weapons selection function 160. The lead angle calculation function uses the weapons type information and the autotracker information to calculate the amount of weapons offset, i.e., lead angle, based on the type of weapons selected, to impact a target having a track and velocity corresponding to the target track and position information provided from the autotracker function. The lead angle is provided on a line 161 to the summing junction 156 where it is added to the target line of sight vectors to provide a corrected azimuth command on a line 165.

The corrected azimuth command on the line 165 is applied to a summing junction 168. The other input to the summing junction 168 is a bore sight correction signal on a line 170 from the weapons selection function 160. The bore sight correction signal is indicative of the offset between the selected weapon and the aircraft reference axis. The output of the summing junction 168 is an azimuth command which is the azimuth component of an aiming line of sight. The aiming line of sight is indicative of the weapon trajectory determined by the fire control for the weapon to successfully impact the target. The azimuth command is applied on a line 172 to a complementary filter function 175. The complementary filter may be of any suitable type known in the art for allowing aircraft body rate frequency band width to remain high while lowering aircraft body rate response to noise from the fire control path. The output of the complementary filter is the IFFC azimuth command signal on the line 140.

It will therefore be understood by those skilled in the art that the IFFC coupled aiming function uses the AFCS attitude hold signal path, which is normally provided with a yaw attitude feedback error signal. The normal attitude hold function is engaged prior to initiation of IFFC coupled aiming. After initiation of IFFC coupled aiming, the normal attitude feedback path for the yaw axis is modified by replacing the yaw attitude feedback error signal with the IFFC azimuth command signal. Since the fire control azimuth command signal is essentially the same signal that would otherwise be commanding a gun turret angle, the fire control solution is satisfied when the fire control command signal is zero, i.e., a turreted gun would be commanded to exactly align with the airframe. This assumes that the target line of sight is combined with the proper lead angle, including ballistics, target and ownship states, by the fire control function. Additionally, the fire control solution is assumed to account for the weapon bore sight alignment with respect to the airframe and autotracker.

Figure 6:
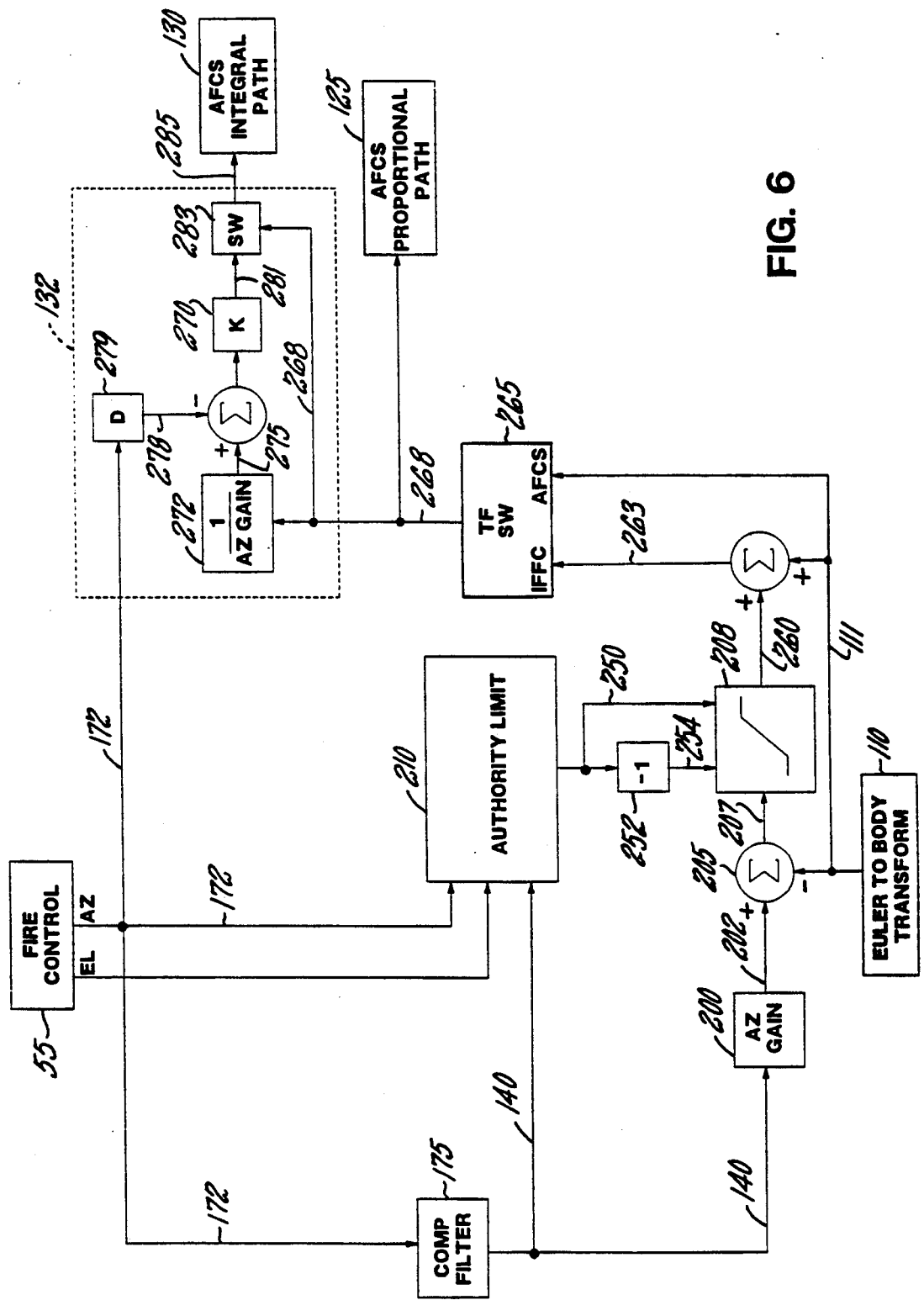
FIG. 6 is a schematic block diagram of an enable portion of the yaw/pitch attitude control of FIG. 5.

Referring now to FIG. 6, the function of the limiter/fader portion 120 of the IFFC is to fade-in the fire control azimuth and elevation commands in place of the yaw and pitch attitude feedback error signals when IFFC coupled aiming is enabled. FIG. 6 signals; however, it is equally applicable to pitch and elevation signals as will be obvious to those skilled in the art. As described hereinbefore with respect to FIG. 5, a fire control azimuth command signal is provided on a line 172 from the fire control system 55. The fire control azimuth command is provided to the complementary filter 175, the output of which is an IFFC azimuth command signal on a line 140. The azimuth command signal is applied to a gain function 200, the output of which is provided on a line 202 to a summing junction 205. The gain function 200 is used to set the IFFC response for small errors without affecting the normal AFCS attitude gain value. It may be desirable to provide the IFFC with a larger gain for small errors to make the aircraft attitude more responsive to fire control azimuth commands, so that the aircraft rapidly assumes and maintains the correct firing attitude.

The other input to the summing junction 205 is the yaw attitude feedback error signal on the line 111, from the output of the Euler to Body Transform 110 (FIG. 5). The output of the summing junction 205 is an IFFC attitude error signal on a line 207, which is applied to a limiter function 208. The magnitude of the IFFC attitude error signal is the size of the change in attitude commanded by the fire control azimuth command from the pilot's commanded yaw attitude. The upper and lower limits of the limit function 208 are determined in an authority limit portion 210 of the IFFC. The authority limit portion 210 is responsive to the fire control azimuth and elevation commands. The output of the authority limit portion 210 is provided on a line 250 to the limiter function 208 to determine the limiter function upper limit, and is provided to a multiplier 252 having a value of negative one, the output of which is the limiter function 208 lower limit on a line 254.

It will be noted that for larger azimuth commands on the line 140, the value of the gain 200 will change the value of the fire control azimuth command on the line 140 at which the limiter function 208 acts. For example, if the limiter upper limit is 6 degrees and the gain function has a value of 2, the limiter function upper limit is 3 degrees with respect to the fire control azimuth command. However, the limiter still acts at six degrees with respect to the change in attitude indicated by the attitude feedback error The IFFC attitude error signal is provided on the line 207 to the limiter function 208 to thereby limit its magnitude. The output of the limiter function 208 is provided on a line 260 to a summing junction 262. The other input to the summing junction 262 is the yaw attitude feedback error signal on the line 111.

The output of the summing junction 262 is an IFFC azimuth command signal on a line 263, the magnitude of which is limited with respect to the change it can command from the pilot's commanded attitude. If the difference between the IFFC azimuth command signal and the AFCS attitude feedback error signal is large, the limiter function 208 limits the magnitude of that difference to limit the effect of the IFFC attitude command signal on the aircraft attitude.

The magnitude limited IFFC azimuth command signal on the line 263, and the AFCS attitude feedback error signal on the line 111, are applied to a transient free switch 265. The transient free switch 265 is controlled by a pilot engageable switch, located for example on the sidearm controller 29 (FIG. 4). The output of the transient free switch is the AFCS attitude feedback error signal when the pilot is not depressing the sidearm controller switch, and the output of which is the IFFC magnitude limited azimuth command signal when the pilot is engaging the sidearm controller switch. Therefore, the IFFC coupled aiming mode will only be enabled when the pilot is manually engaging the transient free switch 265. If at any time during operation in the coupled aiming mode the pilot releases the switch, the system will return to normal operation.

The output of the transient free switch is provided on a line 268 to the gain function 125 in the AFCS proportional path (FIG. 5). The output of the transient free switch 265 is also provided on the line 268 to the integrator 130 in the AFCS integral path via the signal selection/conditioning function 132. It is desirable to provide a high gain in the integral path during operation in the coupled aiming mode so that the attitude of the aircraft will rapidly assume the targeting solution. The increased integral gain is provided in a gain function block 270. The IFFC azimuth command signal is provided to the integral path via gain function 272 which divides the signal by the proportional path azimuth gain. Therefore, the value of the signal is returned to a unity scale of fire control angle error for ease of understanding the operation of the integral path function. The output of the gain function 272 is provided on a line 275 to a summing junction 276. The other input to the summing junction 276 is the fire control azimuth command rate on a line 278 provided as the output of a differentiating function 279 which differentiates the fire control azimuth command on the line 172. The fire control azimuth command rate is provided to the summing junction 276 as an error damping signal to damp out over controlled integrator response caused by using the large gain in gain function 270. The output of the gain function 270 is provided on a line 281 to a switch 283. The other input to the switch 283 is the output of the transient free switch 265 on the line 268. The switch 283 is responsive to the activation of the transient free switch. During normal operations, the switch provides the attitude feedback error signal on the line 268 directly to the AFCS integral path on line 285. During operations in the coupled aiming mode, the switch provides the IFFC azimuth command signal on the line 281 to the AFCS integral path on line 285.

Referring again to FIG. 5, a rate error feedback path attempts to drive the yaw rate error signal on the line 89 to zero during normal operations. The rate error is reference to the pilot commanded yaw rate on the line 74 and the actual aircraft yaw rate on the line 142. During operation in the coupled aiming mode, the attitude feedback path attempts to drive the azimuth command signal, i.e., azimuth aiming error, to zero. Normal operation of the rate feedback path in the coupled aiming mode would result in a steady state error between the aircraft yaw attitude and the azimuth command signal because the rate error is referenced to actual aircraft yaw rate. Therefore, the rate feedback path of FIG. 7 is used to provide the attitude rate error signal during operation in the coupled aiming mode to eliminate the steady state error.

Figure 7:
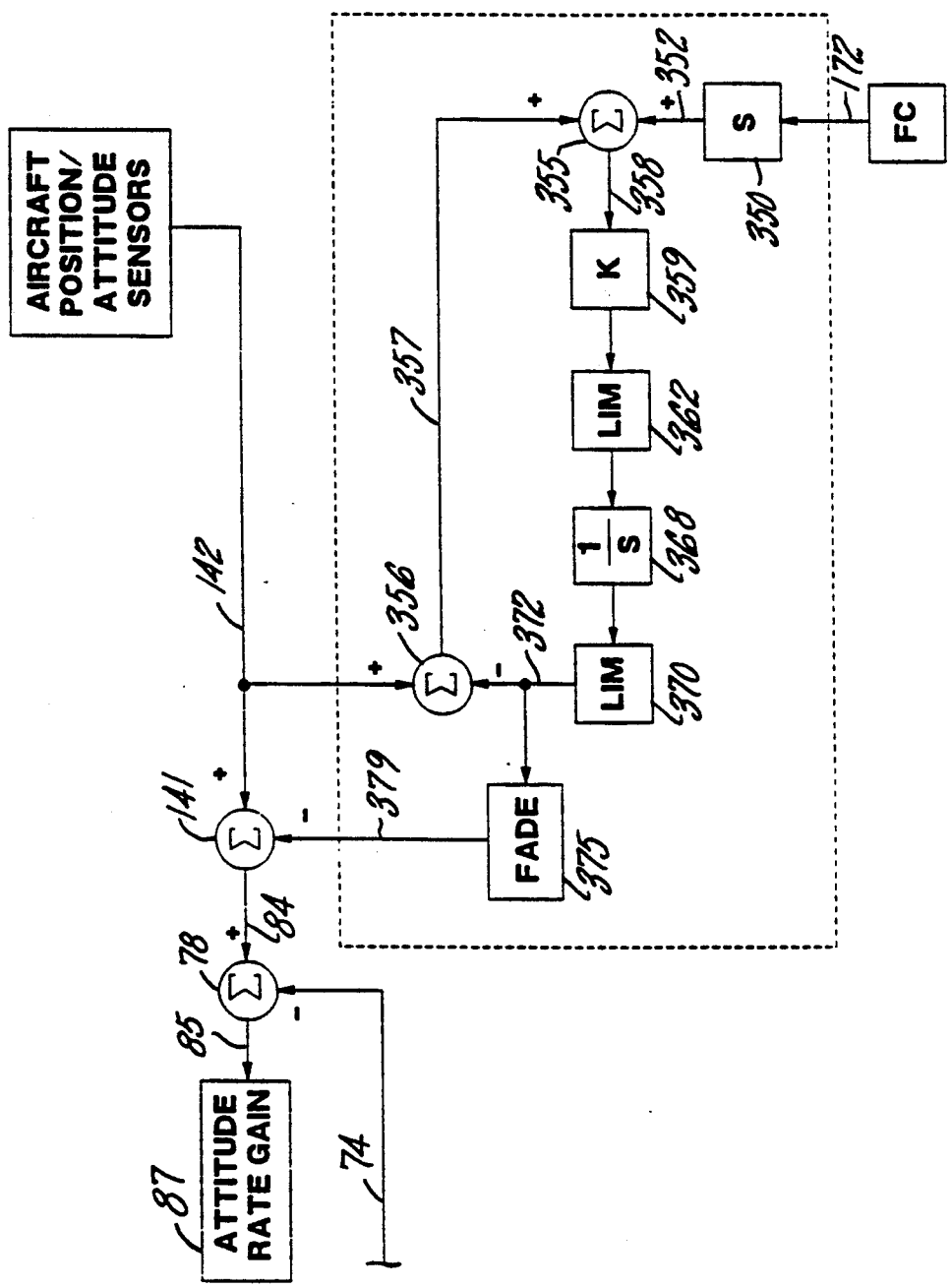
FIG. 7 is a schematic block diagram of a rate feedback path of the yaw/pitch attitude control of FIG. 5.

Referring to FIG. 7, the azimuth command is provided on the line 172 to a differentiator 350. The output of the differentiator 350 is an azimuth rate signal on a line 352 indicative of the rate of change of the azimuth command. The azimuth rate signal is applied to a summing junction 355. The other input to the summing junction 355 is the aircraft yaw rate signal on line 142 via summing junction 356 and line 357. The output of the summing junction 355 is an IFFC yaw attitude rate error signal on a line 358. provided to a gain function 359, the output of which is provided to a rate limiter 362. The rate limiter 362 limits the IFFC yaw attitude rate error signal if the limiter rate of change limits are exceeded. The IFFC yaw attitude rate error signal is then integrated in an integrator function 368, the output of which is applied to an authority limiter 370. The authority limiter 370 limits the IFFC yaw attitude rate error signal if the limiter magnitude limits are exceeded.

The output of the authority limiter 370 is provided on a line 372 to a fade function 375 and to the summing junction 356. Feeding back the output of the authority limiter 370 via summing junction 356 has the effect of creating a lag function with respect to the fire control azimuth rate signal, making the output of the integrator 368 follow the azimuth rate signal. The time constant of the lag function is determined by the magnitude of the gain function 359.

The fad function 375 provides its output to the summing junction 141 on line 379 in response to the operation of the transient free switch 265. When the transient free switch is not engaged, the output of the fade function is zero, and if the transient free switch is engage, the fade function fades its input on line 372 onto the output line 379. It will therefore be understood that the output of the summing junction 141 is the aircraft yaw rate during normal operations. Upon engagement of the couple aiming mode, the output of the summing junction 141 is the IFFC azimuth rate error. Therefore, during operation in the coupled aiming mode, the rate error feedback path attempts to drive the aiming rate to zero.

Figure 8:
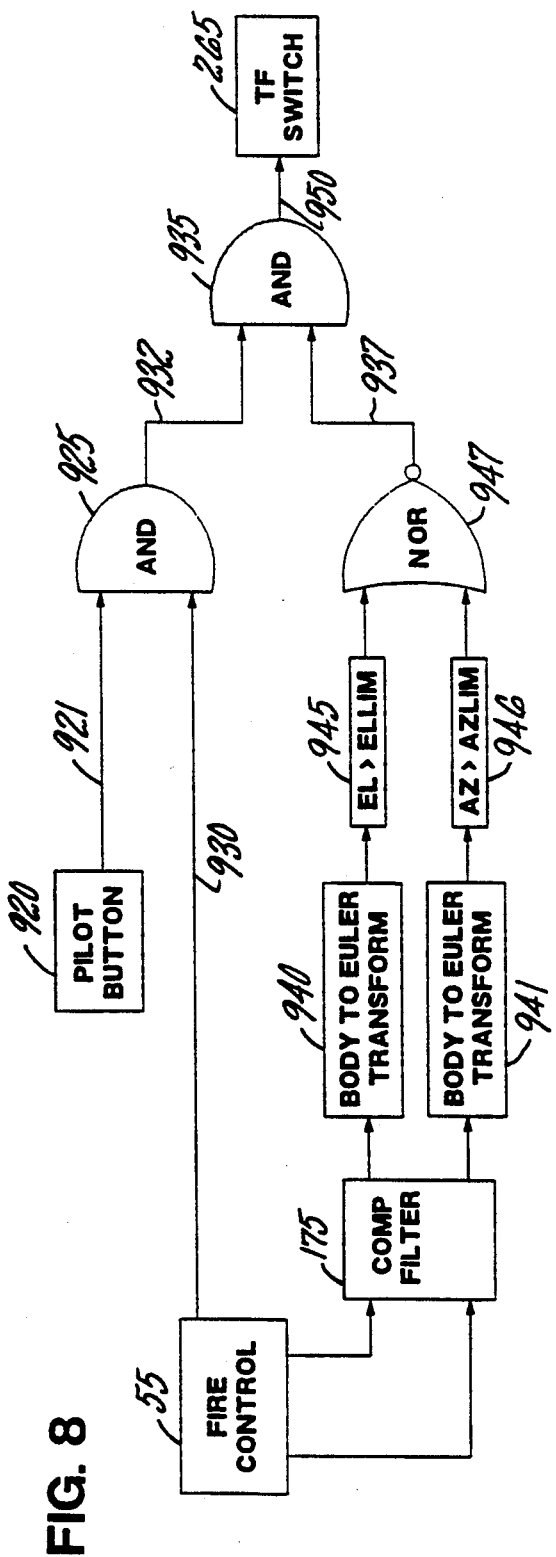
FIG. 8 is a schematic block diagram of control logic for controlling the operation of a yaw and pitch transient free switch.

The transient free switch 265 (FIG. 6) is described as being activated in response to the pilot depressing a switch or button on the sidearm controller 29 (FIG. 4). However, it may be desirable to prohibit operation in the coupled aiming mode unless certain other requirements are met. An example of a more complex control for the transient free switch 265 is shown in FIG. 8. When the button 920 on the pilot's sidearm controller is depressed, a signal is provided on a line 921 to AND gate 925. The other input to the AND gate 925 is a valid fire control signal on a line 930 from the fire control 55. The valid fire control signal is indicative of the fire control system being activated, a weapon being selected of the type requiring yaw and/or pitch attitude controlled for targeting, e.g., a fixed forward gun, and a target being tracked by the fire the pilot depresses the button 920 and the valid fire control signal is present, then the AND gate provides a signal on a line 932 to a second AND gate 935.

The other input to the AND gate 935 is an AZ/EL within limits signal on a line 937. The AZ/EL within limits signal is indicative of the magnitude of both the fire control azimuth and elevation signals (in an inertial reference) being below respective threshold limits. The fire control elevation command is provided via the complementary filter 175 to a Body to Euler Transform 940. Similarly, the fire control azimuth command is provided via the complementary filter 175 to a Body to Euler Transform 941. The Transforms 940,941 convert the fire control signals from a body axes reference to an inertial axes reference. Next, the fire control signals are provided to function 945,946 which determine if the magnitude of the fire control elevation and azimuth commands are greater than respective threshold limits. If both the azimuth and elevation commands are below the respective threshold limits, NOR gate 947 provides a signal on the line 937 to the AND gate 935. If all of the conditions are met, AND gate 935 provides a signal on a line 950 to activate the transient free switch 265.

Typically, when a pilot is maneuvering into a firing attitude to fire on a target, and a turn is required, the pilot will input a roll via the cyclic stick. If the aircraft speed is above a certain level, typically 60 knots, the AFCS commands a coordinated yaw input based on the sensed lateral acceleration. The yaw coordination signal modifies the tail rotor command signal as necessary to drive the helicopter's lateral acceleration to zero, thereby placing the helicopter in a coordinated turn. U.S. Pat. Nos. 4,003,532; 4,067,517; 4,206,891 and 4,484,283; all assigned to the assignee of the present invention, are examples of fly-by-wire flight control systems which provide automatic coordinated yaw inputs such as described above.

During operation in the IFFC coupled aiming mode, the yaw command modifying signal is provided by the IFFC azimuth command signal via the AFCS proportional and integral paths. During certain yaw maneuvers commanded by the yaw command modifying signal in the coupled aiming mode, it may be desirable to provide a coordinated turn, particularly at high speeds. However, using the normal AFCS automatic turn coordination control is not feasible in the IFFC coupled aiming mode for two reasons: first, the change in aircraft attitude due to operation in the coupled aiming mode will only modify aircraft yaw and pitch attitude and the fire control solution will not effect aircraft roll; second, it would be undesirable for the AFCS to provide a coordinating yaw input signal because it would have an effect on the yaw attitude commanded by the IFFC azimuth command signal, thereby degrading the commanded firing attitude. Therefore, the automatic turn coordination control of FIG. 9 is provided for controlling aircraft roll (bank angle) during a change in yaw commanded by the IFFC azimuth command signal while operating in the coupled aiming mode.

Figure 9:
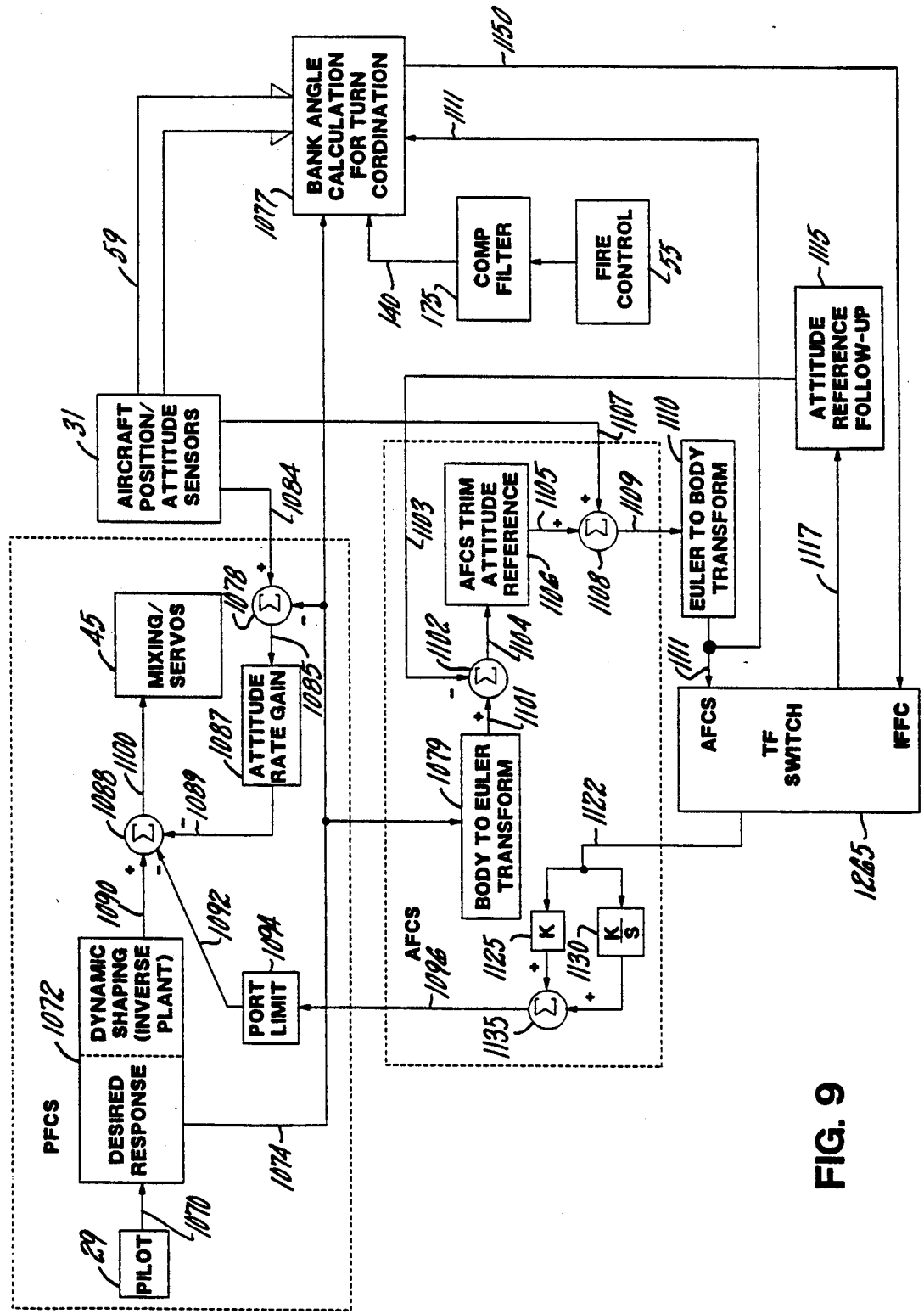
FIG. 9 is a schematic block diagram of an automatic turn coordination control portion of the integrated fire and flight control system of FIG. 4.

FIG. 9 illustrates the functional interconnection of the IFFC roll module 62 with the PFCS 22 and the AFCS 24. The PFCS receives a roll axis command signal on line 1070, provided through trunk lines 33 and lines 30, from the sidearm controller 29 (FIG. 4). As described hereinbefore, the sidearm controller is a four-axis force stick in which roll axis command signals are generated by the pilot applying a left or right force to the sidearm controller. The roll command signal is presented to the input of signal shaping circuitry 1072. The signal shaping circuitry comprises a desired rate response section that provides a commanded roll rate signal on a line 1074 indicative of the desired rate of change of the aircraft attitude about the roll axis. Additionally, the signal shaping circuitry 1072 comprises a dynamic shaping section, which is an inverse model of the approximate plant roll axis response, for providing a control command signal on a line 1090. The control command signal on line 1090 represents the approximate rotor command necessary to achieve the desired roll axis rate of change of the aircraft for each pilot commanded maneuver, and provides the primary control input to the rotor mixing function 45.

The commanded roll rate signal on line 1074 is presented simultaneously to: a summing junction 1078 in the PFCS, a Body to Euler Transformation 1079 in the AFCS, and a bank angle calculation module 1077. The summing junction 1078 sums the commanded roll rate signal on line 1074 (from the signal shaping circuitry 1072) with the aircraft's actual roll rate, received (from sensors 31, through lines 32 and trunk 33) as a sensed roll rate signal on line 1084. The output of the summing junction 1078 is a roll rate error signal on a line 1085. The roll rate error signal is amplified in a rate gain stage 1087 and is provided on a line 1089 to one input of a second PFCS summing junction 1088. The summing junction 1088 also receives the control command signal on line 1090 from the signal shaping circuitry 1072, and a roll command modifying signal on a line 1092 from a rate and magnitude limiter 1094. The limiter 1094, which receives a non-limited version of the roll command modifying signal on a line 1096 (through bus 43) from the AFCS, limits the roll command modifying signal if its magnitude and rate of change limits are exceeded. The output of the summing junction 1088 is provided on a line 1100, and presented through the PFCS output trunk lines 44 to the mixing function 45.

A roll attitude feedback error signal is normally used to provide the roll command modifying signal. However, during operation of the IFFC in the coupled aiming mode, the banked angle calculation module 1077 is used to provide the roll command modifying signal. The roll attitude feedback error signal is developed in the AFCS. The commanded roll rate signal is provided on the line 1074 to the Body to Euler Transformation 1079. The transformation 1079 transforms the roll rate signal, which is in terms of aircraft body axes, to an inertial axes reference on a line 1101, which is provided to a summing junction 1102. The other input to the summing junction 1102 is a roll attitude reference follow-up error signal on a line 1103. The output of the summing junction 1102 is provided on a line 1104 to an AFCS trim attitude reference function 1106. The reference function 1106 is an integral function which converts the commanded roll rate signal (in terms of inertial axes on the line 1101) to a commanded roll attitude signal on a line 1105. The commanded roll attitude signal is provided to a summing junction 1108, the other input of which is a roll attitude signal on a line 1107, provided from sensors 31, through lines 32 and trunk 34 (FIG. 4). The output of the summing junction 1108 is the roll attitude feedback error signal on a line 1109 in terms of inertial axes, and is the difference between the commanded roll attitude on the line 1105 and the actual aircraft roll attitude on the line 1107. The roll attitude feedback error signal is provided to an Euler to Body Transform 1110 which transforms the roll attitude feedback error signal from an inertial axes reference back to an aircraft body axes reference on a line 1111. The operation of both transform functions 1079, 1110 are described in greater detail hereinbefore with respect to FIG. 6.

During operation of the system in the coupled aiming mode, the roll attitude feedback error signal is replaced by an IFFC roll signal provided by the bank angle calculation module 1077. Therefore, there may be a difference between the roll attitude reference as indicated by the AFCS and the actual aircraft roll attitude because the roll attitude feedback error signal was not used to provide the roll command modifying signal. Therefore, the roll attitude reference follow-up error signal is provided on the line 1103 to the summing junction 110 to modify the roll rate signal on the line 1104. The roll attitude rate follow-up error signal is provided by a roll attitude follow-up portion 1115 of the IFFC. The roll attitude follow-up portion receives a roll attitude follow-up error signal on a line 1117, and converts it to a roll attitude reference follow-up error signal.

The roll attitude feedback error signal on the line 1111 is applied to a roll transient free switch 1265. During normal operations, the roll transient free switch 1265 passes the roll attitude feedback error signal to the line 1122, where the roll attitude feedback error signal is applied via a proportional path containing a gain function 1125, and an integral path containing an integral function 1130, to a summing junction 1135. The output of the summing junction 1135 is the roll command modifying signal on the line 1096.

The bank angle calculation module 1077 is responsive to an air speed signal, a heading rate signal, a pitch rate signal, a yaw rate signal, a side slip signal, a lateral acceleration signal, a yaw attitude signal, a pitch attitude signal and a roll attitude signal, provided from sensors 31 through lines 32 and trunk 59 (FIG. 4) respectively on lines 1136 through 1144. As used herein, the term side slip is intended to refer to the angle formed between the the pointing direction of the aircraft nose and a vector corresponding to the direction of the relative wind. Positive side slip occurs when the wind is coming from the right hand side of the aircraft, i.e., the aircraft nose is left of the relative wind vector. Negative side slip occurs when the wind is coming from the left hand side of the aircraft. The IFFC azimuth command signal is provided on the line 140 to the bank angle calculation module 1077 from the fire control 55 via the complementary filter 175. The output of the bank angle calculation module is an IFFC roll command signal on a line 1150. During operation of the system in the coupled aiming mode, the roll transient free switch 1265 replaces the roll attitude feedback error signal on the line 1122 with the IFFC roll command signal on the line 1150.

Figure 10:
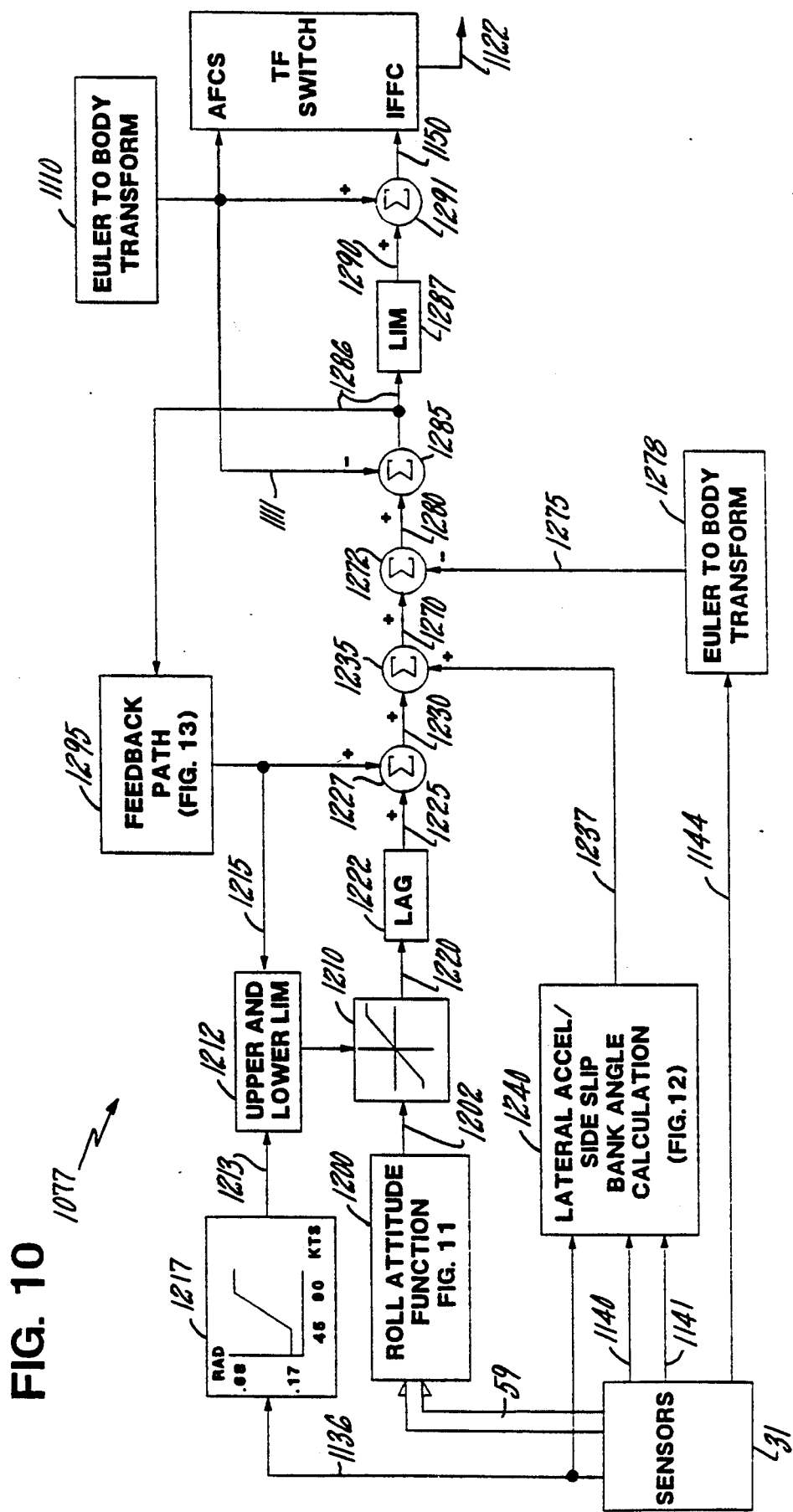
FIG. 10 is a schematic block diagram of a bank angle calculation portion of the automatic turn control of FIG. 9.

The bank angle calculation logic 1077 will calculate a bank angle based on air speed, aircraft heading rate, and a line of sight heading rate. Additionally, the bank angle calculation module will provide further bank angle modification to drive lateral acceleration and/or side slip to zero. Referring to FIG. 10, a roll attitude function 1200 provides a desired roll attitude signal on line 1202 to a limiter function 1210. The desired roll attitude signal comprises an aircraft heading rate component and a line of sight heading rate component.

The roll attitude function 1200 is shown in greater detail in FIG. 11. Referring to FIG. 11, the fire control elevation command is provided to a differentiating function 1701, the output of which is an azimuth rate signal on a line 1702, e.g., an aiming pitch rate signal with respect to the aircraft body in the pitching axis. The azimuth rate signal is provided to a summing junction 1703, the other input of which is the aircraft pitch rate signal provided by sensors 31 on line 1138. The output of the summing junction 1703 is a LOS pitch rate signal on a line 1704 indicative of the inertial rate of rotation of the aiming LOS with respect to the earth, resolved in the aircraft pitch axis frame of reference. This represents the rate of rotation in inertial space that the aircraft should be pitching if it is at the proper rate for tracking the target. Similarly, the fire control azimuth command is provided to a differentiating function 1705, the output of which is an azimuth rate signal on a line 1706. The azimuth rate signal is provided to a summing junction 1707, the other input of which is the aircraft yaw rate signal provided by sensors 31 on line 1139. The output of the summing junction 1707 is a LOS yaw rate signal on a line 1708 indicative of the inertial rate of rotation of the aiming LOS with respect to the earth, resolved in the aircraft yaw axis frame of reference.

The LOS pitch rate signal (LOSPR) and the LOS yaw rate signal (LOSYR) are applied to a LOS heading rate calculation function block 1710. The aircraft pitch attitude (THETAB) and yaw attitude (PHIB) are also applied to the function block 1710 respectively on lines 1143 and 1142. The function block 1710 calculates a LOS heading rate signal indicative of the heading rate of the aiming LOS with respect to an inertial frame of reference resolved to the earth's horizontal plane. The LOS heading rate calculation function uses equation 2 below to determine the LOS heading rate signal (LOSHR):

$$LOSHR = [LOSPR*\sin(PHIB) + LOSYR*\cos(-PHIB)]/\cos(THETAB) \quad \text{(Equation 2)}$$

The LOSHR component of the desired roll attitude signal is provided by applying the LOSHR signal to a bank angle calculation function 1730. The other input to the bank angle calculation function 1730 is air speed on the line 1136. The bank angle calculation function 1730 uses equation 3 below to determine the desired roll attitude (RA):

$$RA = ATAN\,[(\text{heading rate})*(\text{air speed})/(\text{gravity})*(C)] \quad \text{(Equation 3)}$$

where C is a constant for unit conversion, if necessary. The LOSHR component of the desired roll attitude signal is next applied to a gain function 1732.

Similarly, the aircraft heading rate is provided on the line 1137 to a bank angle calculation function 1740. This function also uses air speed on line 1136 to calculate the aircraft heading rate component of the desired roll attitude signal using equation 3 above. The aircraft heading rate component of the desired roll attitude signal is applied to a gain function 1742.

The magnitude of the desired roll attitude signal is dependant upon aircraft heading rate for large fire control azimuth commands, indicative of large aiming errors. As the aiming error is reduced, the desired roll attitude signal is dependant upon the LOS heading reduces, the calculated bank angle will be dependant upon aircraft heading rate required to maintain the proper firing attitude.

The LOS heading rate component of the desired roll attitude signal is provided on a line 1712 and the aircraft heading rate component of the desired roll attitude signal is provided on line 1713 to gain functions 1715 and 1716 respectively. The gain functions have reciprocal characteristics such that for small fire control azimuth commands on the line 140, the LOS heading rate gain 1715 is at its maximum magnitude, i.e., one, and the aircraft heading rate gain 1716 is at its minimum magnitude, i.e., zero. As the magnitude of the fire control azimuth command increases, the magnitude of the aircraft heading rate gain function 1716 increases to its maximum value while the magnitude of the LOS heading rate gain function 1715 decreases to its minimum value. Therefore, for small fire control azimuth commands, the desired roll attitude signal will be determined predominantly using the LOS heading rate component on the line 1712, and as the magnitude of the fire control azimuth command signal increases, the aircraft heading rate component on the line 1713 is predominantly used to provide the desired roll attitude signal. The output of the gain functions 1715 and 1716 are provided on lines 1718 and 1719 respectively to a summing junction 1720. The output of the summing junction 1720 is the desired roll attitude signal on the line 1202, which is provided to limiter 1210.

Referring again to FIG. 10. the magnitude of the upper and lower limits of limiter 1210 are determined in a function 1212 which selects the upper and lower limits as the greater of a speed limit signal on a line 1213 and an IFFC roll initial trim signal on a line 1215. The speed limit signal on the line 1213 is provided from a speed limit function 1217. The speed limit function is responsive to the air speed signal on the line 1136, and limits the magnitude of the bank angle based on the aircraft air speed. As will be described in greater detail hereinafter with respect to FIG. 13, the IFFC roll initial trim signal is provided from an IFFC feedback path. During normal operations, the input of the feedback path is an IFFC roll error signal, and during operation in the coupled aiming mode, the input of the feedback path is the pilot commanded roll rate signal.

The output of the limiter 1210 is provided on a line 1220 to a rate limited lag function 1222. The lag function 1222 slows the response and limits the rate of change of the desired roll attitude signal so that the aircraft does not bank too fast. The output of the rate limited lag function is provided on a line 1225 to a summing junction 1227 where it is summed with the IFFC roll initial trim signal on the line 1215. The output of the summing junction 1227 is provided on a line 1230 to a summing junction 1235. The other input to the summing junction 1235 is a bank angle signal which corresponds to aircraft lateral acceleration and/or side slip on a line 1237.

The magnitude of the bank angle signal is derived to change the aircraft bank angle so that lateral acceleration and/or side slip is driven to zero. Typically, when a pilot manually commands turn coordination, lateral acceleration is zero; however, due to the tail rotor's side force, side slip does not actually reach zero. This type of control has proven to be adequate for normal operating conditions. However, during operations in the coupled aiming mode, weapons targeting accuracy would improve by providing control inputs to drive side slip to zero. Therefore, the control of the present invention initially will attempt to drive lateral acceleration to zero, and then attempt to drive side slip to zero.

Figure 12:
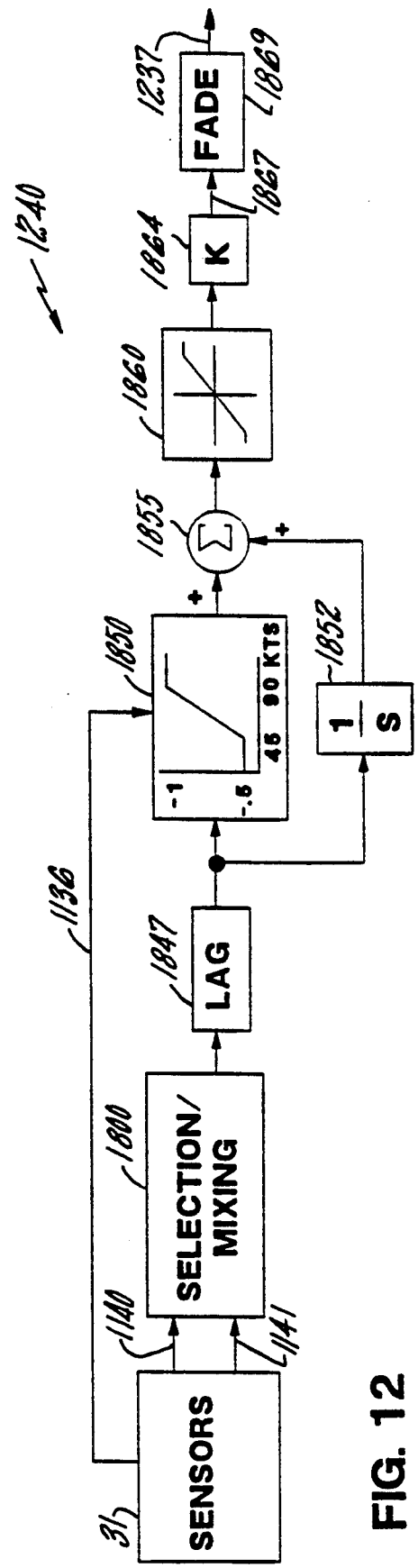
FIG. 12 is a schematic block diagram of a lateral acceleration/side slip bank angle calculation function of the bank angle calculation portion of FIG. 10.

The bank angle signal is provided by a bank angle calculation function 1240, which is described in greater detail with respect to FIG. 12. Referring to FIG. 12, lateral acceleration is provided on line 1141 and side slip is provided on a line 1140 to selection and mixing function 1800. Initially, the output of the selection and mixing function 1800 will be the lateral acceleration signal, and after the aircraft assumes a bank angle, the lateral acceleration signal is faded out and the side slip signal is faded in. This may be accomplished simply as a function of time, or may also be dependant upon the magnitude of the azimuth aiming error such that the sideslip signal in not faded in as the output of the selection/mixing function until the azimuth aiming error is below a threshold magnitude.

The output of the selection/mixing function 1800 is provided via a lag filter 1847 to a proportional path having a gain function 1850 and an integral path containing an integral function 1852. The gain function 1850 is also responsive to air speed on the line 1136. The magnitude of the gain function 1850 is at its lowest value, e.g., −0.5, for low air speeds, e.g., less than 35 knots, and is at its highest value, e.g., −1, for higher air speeds, e.g., greater than 90 knots. The output of the integral and proportional paths are summed at a summing junction 1855, the output of which is provided to a limiter 1860 which limits the magnitude of the commanded bank angle. The output of the limiter 1860 is provided to a gain function 1864 for converting the bank angle signal from degrees to radians. The output of the gain function 1864 is provided on a line 1867 to a fader 1869. The fader 1869 is responsive to the operation of a roll transient free switch 1265 (FIG. 16). When the switch is not actuated, indicating that the turn coordination in the coupled aiming mode is not engaged, the output of the fader is zero on the line 1237. However, when the switch is actuated, the fader fades in the bank angle signal on the line 1867 to the line 1237.

Referring again to FIG. 10, the output of the summing junction 1235 is the total IFFC commanded bank angle, and is provided on a line 1270 to a summing junction 1272. The other input to the summing junction 1272 is a body roll attitude (e.g., bank angle) signal on a line 1275. The roll attitude signal on the line 1144 is applied to an Euler to Body Transform 1278 which converts the roll attitude signal from an inertial axes reference to a body axes reference on the line 1275. The output of the summing junction 1272 is an IFFC body reference roll attitude error signal on a line 1280.

The IFFC body reference roll attitude error signal is provided on the line 1280 to a summing junction 1285. The other input to the summing junction 1285 is the AFCS roll attitude feedback error signal on the line 1111. The output of the summing junction 1285 is an IFFC roll error signal on the line 1286 which is the difference between the IFFC body reference roll attitude error signal and the AFCS roll attitude feedback error signal. The IFFC roll error signal is applied to a limiter function 1287 which limits the magnitude of the IFFC roll error signal to thereby limit the authority of the IFFC to pull the aircraft away from its pilot commanded roll attitude. The output of the limiter function 1287 is provided on a line 1290 to a summing junction 1291 where it is summed with the AFCS roll attitude feedback error signal on the line 1111. The output of the summing junction 1291 is the IFFC roll command signal on the line 1150.

The IFFC roll command signal on the line 1150 is applied to one input of the roll transient free switch 1265. The roll attitude feedback error signal on the line 1111 is provided to another input of the roll transient free switch. The output of the roll transient free switch is provided on the line 1122 to the AFCS integral and proportional paths (FIG. 9). The operation of the roll transient free switch is described hereinafter with respect to FIG. 14.

During normal operations, the IFFC roll error signal on the line 1286 is provided in a feedback path 1295 to produce the IFFC roll initial trim signal on the line 1215. Referring to FIG. 13, the IFFC roll error signal is applied to a gain function 1900 having a negative gain value. The output of the gain function is provided via a normally closed switch 1905 to a summing junction 1910. The other input to the summing junction 1910 is the commanded roll rate signal on the line 1074 via normally open switch 1912. The operation of normally closed switch 1905 and normally open switch 1912 is dependent upon the status of the roll transient free switch 1265. During normal operations, i.e., coupled aiming mode not engaged, normally closed switch 1905 is closed and normally open switch 1912 is open. When IFFC turn coordination is activated in the coupled aiming mode, normally closed switch 1905 is open, and normally open switch 1912 is closed. The output of the summing junction 1910 is provided to a limiter 1917 which limits the magnitude of the error signal. The output of the limiter 1917 is integrated by integral function 1920 to provide the IFFC roll initial trim signal on the line 1215.

Therefore, during normal operations, the IFFC roll error signal is provided in the feedback path to drive the roll error to zero. This is intended to prevent a large jump in commanded roll attitude upon activation of the coupled aiming mode. During operation in the coupled aiming mode, the commanded roll rate signal is provided in the feedback path so that the roll modifying signal will be dependent upon the pilot commanded roll rate signal in addition to the aircraft attitude commanded by the fire control solution. Therefore, pilot commanded bank angles will maintain authority.

During operation in the coupled aiming mode, a feedback loop may be provided around the integrator 1920 in the feedback path. The output of the integrator is provided on line 1215 to a gain function 1921. The output of the gain function 1921 is provided to a limiter 1945 which limits the magnitude of the signal in the feedback loop. The output of the limiter is provided to the summing junction 1910 via a normally open switch 1948. The normally open switch 1948 may be closed in response to the operation of the roll transient free switch 1265 during operation in the coupled aiming mode. The operation of the switch 1948 may also be dependant upon air speed so that it may only be shut when air speed exceeds a threshold magnitude, e.g. 35 knots. The feedback loop has the effect of eliminating the value of the initial trim signal that was present on the line 1215 prior to engagement of IFFC. Additionally, the feedback loop acts as a lag function with respect to the pilot roll input, making the output of the integrator follow the commanded roll rate signal on the line 1074.

Figure 14:
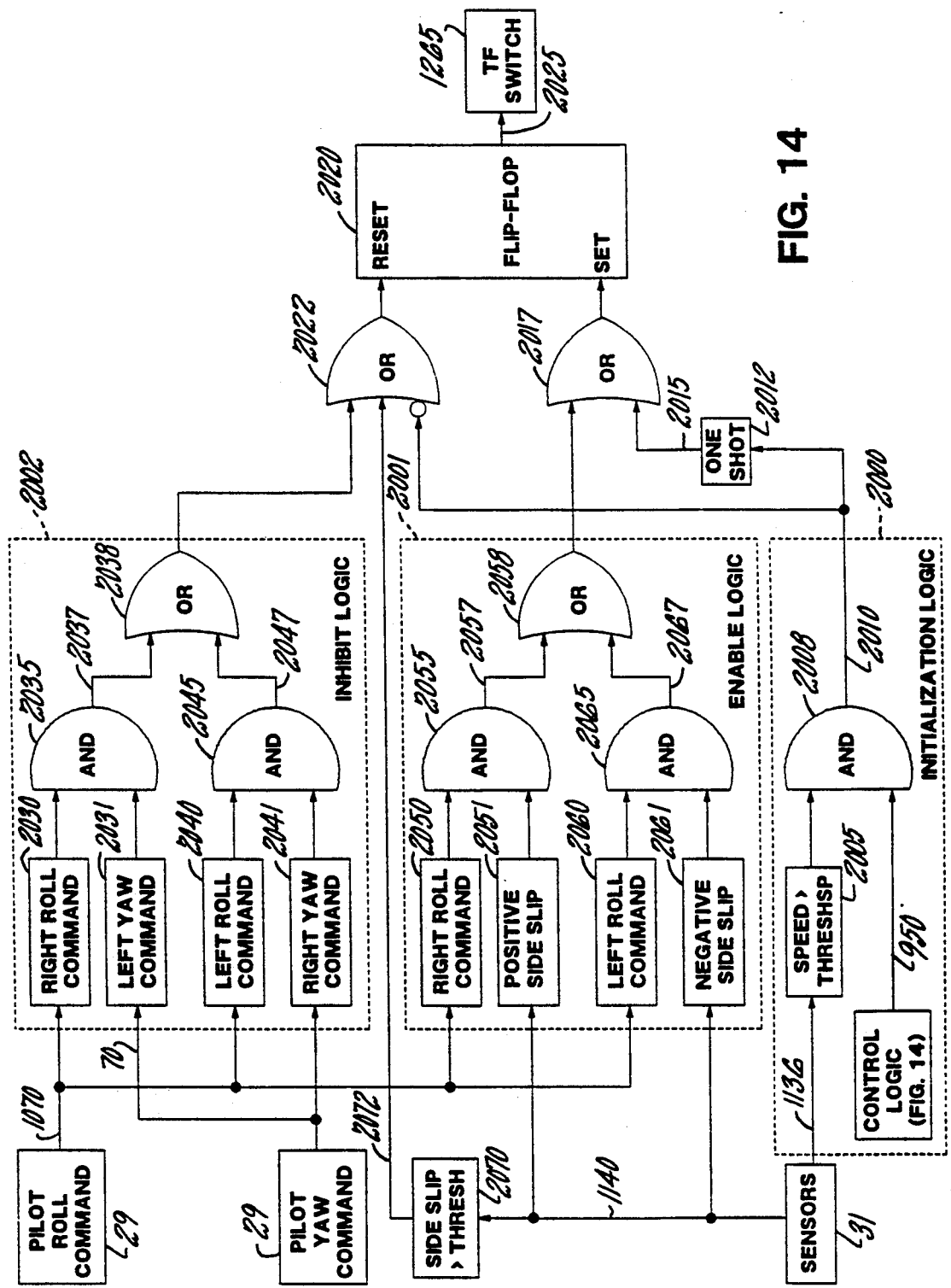

During normal operations, the roll transient free switch will provide the roll attitude feedback error signal to the AFCS integral and proportional paths. However, the transient free switch will provide the IFFC roll command signal to the AFCS integral and proportional paths when IFFC turn coordination is engaged. The control logic of FIG. 14 is used to control the operation of the roll transient free switch 1265. Referring to FIG. 14, the roll transient free switch control logic comprises an initialization logic portion 2000, an enable logic portion 2001, and an inhibit logic portion 2002.

The initialization logic portion 2000 is responsive to the air speed signal on the line 1136 and a signal indicative of the yaw and pitch transient free switch being enabled on the line 950 (FIG. 8). The air speed signal is applied to a function 2005 which provides an output to a first AND gate 2008 when air speed is above a threshold magnitude, e.g., 35 knots. Therefore, if air speed is above the threshold magnitude and the yaw and pitch transient free switches are enabled, AND gate 2008 provides an output signal on a line 2010 to a one shot function 2012. The one shot function provides a momentary output on a line 2015 in response to an input signal on the line 2010, e.g., a monostable multivibrator. The signal on the line 2015 is applied to an OR gate 2017, the output of which is applied to a SET terminal of a flip-flop 2020, e.g., a triggered latch. The output of the AND gate 2008 is also applied on the line 2010 to an inverting terminal of an OR gate 2022. The output of the OR gate 2022 is applied to a RESET terminal of the flip-flop 2020.

The flip-flop 2020 provides an output signal on a line 2025 to enable the roll transient free switch for IFFC turn coordination when a signal is provided to the flip-flop SET terminal. The signal on the line 2025 is removed, and the transient free switch returns to the normal operating mode when a signal is applied to the flip-flop RESET terminal. Therefore, when the yaw and pitch transient free switches are enabled, and speed is above the threshold magnitude, the one shot provides a momentary signal to the flip-flop SET terminal via OR gate 2017 for enabling the roll transient free switch 1265. Thereafter, if speed falls below the threshold magnitude, or if the yaw and pitch transient free switches are disabled, the signal on the line 2010 from AND gate 2008 is removed, and the OR gate 2022 provides a signal to the flip-flop RESET terminal, thereby returning the roll transient free switch to the normal operating mode.

Once the flip-flop is set by the initialization logic 2000, IFFC turn coordination may be disabled by inhibit logic 2002, and reenabled by enable logic 2001. The inhibit logic is responsive to the roll axis command signal on line 1070 and the yaw axis command signal on line 70, provided from the sidearm controller 29 (FIG. 4). If the pilot is inputting a right roll axis command signal above a threshold magnitude and a left yaw axis command signal above a threshold magnitude as determined in function blocks 2030 and 2031 respectively, AND gate 2035 provides an output on a line 2037 to an OR gate 2038. Similarly, if the pilot inputs a left roll axis command signal above a threshold magnitude and a right yaw axis command signal above a threshold magnitude as determined in the function blocks 2040 and 2041 respectively, AND gate 2045 provides an output on a gate 2038 is applied to the flip-flop RESET terminal via OR gate 2022, such that if either of the conditions checked by AND gate 2035 or 2045 are met, a signal is provided to the flip-flop RESET terminal, thereby disabling IFFC turn coordination.

If IFFC turn coordination is disabled by inhibit logic 2002, turn coordination may be reenabled by enable logic 2001. The enable logic is responsive to the roll axis command signal on the line 1070, and the side slip signal on the line 1140. If the pilot inputs a right roll axis command signal above a threshold magnitude while the aircraft is experiencing a positive side slip above a threshold magnitude as determined in function blocks 2050 and 2051 respectively, AND gate 2055 provides an output on a line 2057 to an OR gate 2058. Similarly, if the pilot inputs a left roll axis command signal above a threshold magnitude while the ship is experiencing a negative side slip above a threshold magnitude, as determined in function blocks 2060 and 2061 respectively, AND gate 2065 provides an output signal on a line 2067 to the OR gate 2058. The output of the OR gate 2058 is provided to the flip-flop SET terminal via OR gate 2017. Therefore, if either of the conditions checked by AND gates 2055 or 2065 are met, OR gate 2058 provides a signal to the flip-flop SET terminal via OR gate 2017, thereby re-enabling IFFC turn coordination.

IFFC turn coordination may also be disabled if the aircraft is experiencing a large slide slip. The side slip signal is provided on the line 1140 to a function 2070 which provides an output signal on a line 2072 if the magnitude, i.e., absolute value, of the slid slip signal is above a threshold value. An output signal on the line 2072 is provided to the flip-flop RESET terminal via OR gate 2022, such that if the aircraft is experiencing side slip above the threshold magnitude, turn coordination is disabled. Once side slip is reduced below the threshold magnitude checked in function 2070, turn coordination may be reenabled by enable logic 2002 provided that the initialization logic conditions are met. Turn coordination is disabled for large side slip because this indicates that the pilot intentionally turned to point towards the target and chose to yaw rather than coordinated turn.

The invention is described as controlling both yaw and pitch during operation in the coupled aiming mode. However, the invention will work equally as well in an aircraft having rockets articulated in elevation and not in azimuth, or a gun turreted in elevation and not in azimuth. In such a case, the fire control system elevation command is used to control the elevation of either the turreted gun or rocket, and the integrated fire and flight control system is only used to control aircraft azimuth when operating in the coupled aiming mode. Similarly, if the aircraft is provided with a gun turreted only in azimuth or rockets articulated in azimuth and not in elevation, the fire control command is used to control the gun or rocket azimuth, and the integrated fire and flight system controls only aircraft pitch using the fire control elevation command during operation in the coupled aiming mode. In this case, the automatic turn control of the present invention is not required since the fire control azimuth command is not providing the aircraft azimuth reference in the attitude feedback path. In either case, the principles of the present invention can be used to control aircraft yaw attitude and pitch attitude as required for targeting.

The invention is described as being performed in a flight control system in which calculations are determined digitally, as for example in a digital automatic flight control employing a known microprocessor for performing the algorithmic subroutines of the invention. However, the invention may also be accomplished by dedicated digital hardware or by analog hardware if desired. In such case, it may be implemented in a different fashion from that disclosed herein in accordance with the general equivalence between software as shown herein and dedicated digital hardware and software, all as is well-known to those skilled in the art. Additionally, any cycle times, gains, counts, and the like contained herein may of course be adjusted to suit any implementation and utilization of the invention.

Although the invention has been shown and described with respect to exemplary embodiments thereof, it should be understood by those skilled in the art that the foregoing and other changes, omissions and additions may be made therein and thereto without departing from the spirit and scope of the present invention.

We claim:

1. An aircraft flight control system for providing control surface command signals to the aircraft control surfaces thereby controlling the yaw, pitch, roll and lift attitude axes of the aircraft in flight, comprising:
   fire control means for providing an azimuth command signal and an elevation command signal respectively indicative of the change in aircraft yaw attitude and pitch attitude for an aircraft reference axis to be aligned with an aiming line of sight;
   coupled aiming mode indicating means for providing a coupled aiming signal in response to activation of a flight control system coupled aiming mode;
   said azimuth command signal and said elevation command signal respectively providing the aircraft yaw attitude reference and pitch attitude reference during operation in said coupled aiming mode;
   means for sensing the rat of change of said aiming line of sight and for providing an aiming line of sight heading rate signal indicative thereof;
   means for sensing the rate of change of aircraft heading and for providing an aircraft heading rate signal indicative thereof;
   means for sensing aircraft air speed and for providing an air speed signal indicative thereof; and
   signal processing means responsive to said aiming line of sight heading rate signal, said heading rate signal and said air speed signal for providing a desired roll attitude signal indicative of the aircraft roll attitude which results in a substantially coordinated turn.

2. An aircraft flight control system according to claim 1 wherein said desired roll attitude signal is primarily dependant upon said heading rate signal when said azimuth command signal is above and upper threshold magnitude, said desired roll attitude signal is primarily dependant upon said aiming line of sight heading rate signal when said azimuth command signal is below a lower threshold magnitude, and said desired roll attitude signal is dependant upon both said heading rate signal and said aiming line of sight heading rate signal when said azimuth command signal is between said upper threshold magnitude and said lower threshold magnitude.

3. An aircraft flight control system according to claim 1, wherein said turn coordination means further comprises:
   means for sensing aircraft lateral acceleration and for providing a lateral acceleration signal indicative thereof;
   means for sensing aircraft side slip and for providing a side slip signal indicative thereof;
   said signal processing means being initially responsive to said lateral acceleration signal for providing said desired roll attitude signal with a roll attitude component as a function of aircraft lateral acceleration for driving the magnitude of said lateral acceleration to zero, and after the aircraft attitude assumes a bank angle, responsive said side slip signal for providing said desired roll attitude signal with a roll attitude component as a function of aircraft side slip for driving the magnitude of said side slip signal to zero.

4. An aircraft flight control system according to claim 3 further comprising:
   control means operable by a pilot to provide axis command signal for controlling a given attitude axis of the aircraft;
   means responsive to said axis command signals for providing a desired attitude rate signal indicative of the desired rate of change of the aircraft attitude in said given attitude axis;
   means for sensing the rate of change of the aircraft attitude in said given attitude axis and for providing an actual attitude rate signal indicative thereof;
   means responsive to said desired attitude rate signal and to said actual attitude rate signal for providing an attitude rate error signal as a function of the difference between said desired attitude rate signal and said actual attitude rate signal;
   means responsive to said azimuth command signal and said elevation command signal for providing an azimuth rate signal and an elevation rate signal respectively indicative of the rate of change of said azimuth command signal and said elevation command signal; and
   rate feedback means responsive to the absence of said coupled aiming signal for providing control surface command signals to drive the magnitude of said attitude rate error signal to zero for said given attitude axis, and responsive to the presence of said coupled aiming signal for respectively replacing said attitude rate error signal for the yaw attitude axis and the pitch attitude axis with said azimuth rate signal and said elevation rate signal.

5. An aircraft flight control system according to claim 4 further comprising:
   means responsive to said desired attitude rate signal for providing a desired attitude signal indicative of a desired aircraft attitude in said given attitude axis;
   means for sensing the attitude of the aircraft in said given attitude axis and for providing an actual attitude signal indicative thereof;
   means responsive to said desired attitude signal and to said actual attitude signal for providing an attitude feedback error signal as a function of the difference between said desired attitude signal and said actual attitude signal; and
   attitude feedback means responsive to the absence of said coupled aiming signal for providing control surface command signals to drive the magnitude of said attitude feedback error signal to zero for said given attitude axis, and responsive to the presence of said coupled aiming signal for respectively replacing said attitude feedback error signal for the yaw attitude axis, the pitch attitude axis and the roll attitude axis with said azimuth command signal, said elevation command signal, and said desired roll attitude signal.

6. An aircraft flight control system according to claim 1 further comprising:

means responsive to said coupled aiming signal and said air speed signal being above a threshold magnitude for providing a coordinated turn initialization signal;

said signal processing means being responsive to said initialization signal for providing turn coordination during operation of the flight control system in said coupled aiming mode, and responsive to the absence of said initialization signal for disabling turn coordination during operation of the flight control system in said coupled aiming mode.

7. An aircraft flight control system according to claim 1 further comprising:

control means operable by a pilot to provide axis command signals for controlling a given attitude axis of the aircraft;

inhibit logic means responsive to the simultaneous input of a right roll axis command signal and a left yaw axis command signal, or a left roll axis command signal and a right yaw axis command signal for providing an inhibit signal;

enable logic means responsive to the simultaneous occurrence of a right roll axis command signal and a positive side slip signal, or a left roll axis command signal and a negative side slip signal for providing an enable signal; and said signal processing means being responsive to said inhibit signal for inhibiting turn coordination during operation of the flight control system in said coupled aiming mode, and responsive to the presence of said enable signal for re-enabling turn coordination during operation of said flight control system in said coupled aiming mode.

8. A helicopter integrated fire and flight control system for providing control surface command signals to the helicopter control surfaces thereby controlling the yaw, pitch, roll and lift attitude axes of the helicopter in flight, comprising:

control means operable by a pilot to provide axis command signals for controlling a given attitude axis of the helicopter;

means responsive to said axis command signals for providing a desired attitude rate signal indicative of the desired rate of change of the aircraft attitude in said given attitude axis;

means for sensing the rate of change of the aircraft attitude in said given attitude axis and for providing an actual attitude rate signal indicative thereof;

means responsive to said desired attitude rate signal and to said actual attitude rate signal for providing an attitude rate error signal as a function of the difference between said desired attitude rate signal and said actual attitude rate signal; and rate feedback means responsive to said attitude rate error signal for providing control surface command signals to drive the magnitude of said attitude rate error signal to zero for said given attitude axis; characterized by:

fire control means for providing an azimuth command signal and an elevation command signal respectively indicative of the change in helicopter yaw attitude and pitch attitude for a helicopter airframe reference axis to be aligned with an aiming line of sight;

means responsive to said azimuth command signal and said elevation command signal for providing an azimuth rate signal and an elevation rate signal respectively indicative of the rate of change of said azimuth command signal and said elevation command signal;

coupled aiming mode indicating means for providing a coupled aiming signal in response to engagement of an integrated fire and flight control system coupled aiming mode;

said rate feedback means being responsive to the presence of said couple aiming signal for respectively replacing said attitude rate error signal for the yaw attitude axis and the pitch attitude axis with said azimuth rate signal and said elevation rate signal.

said fire and flight control system further comprising:

means for sensing the rate of change of said aiming line of sight and for providing an aiming line of sight heading rate (LOSHR) signal indicative thereof;

means for sensing the rate of change of aircraft heading and for providing an aircraft heading rate (HR) signal indicative thereof;

means for sensing aircraft air speed and for providing an airspeed signal indicative thereof; and signal processing means responsive to said aiming line of sight heading rate signal, said heading rate signal and said air speed signal for providing a desired roll attitude signal indicative of an aircraft roll attitude which results in a substantially coordinated turn.

9. A helicopter integrated fire and flight control system according to claim 8 wherein said desired roll attitude signal is primarily dependant upon said heading rule signal when said azimuth command signal is above an upper threshold magnitude, said desired roll attitude signal is primarily dependant upon said aiming line of sight signal when said azimuth command signal is below a lower threshold magnitude, and said desired roll attitude signal is dependant upon both said heading rule signal and said aiming line of sight heading rate signal when said azimuth command signal is between upper threshold magnitude and said lower threshold magnitude.

10. A helicopter integrated fire and flight control system according to claim 9 wherein said turn coordination means further comprises:

means for sensing aircraft lateral acceleration and for providing a lateral acceleration signal indicative thereof;

means for sensing aircraft side slip and for providing a side slip signal indicative thereof;

said signal processing means being initially responsive to said lateral acceleration signal for providing said desired roll attitude signal with a roll attitude component as a function of aircraft lateral acceleration for driving the magnitude of said lateral acceleration to zero, and after the aircraft attitude assumes a bank angle, responsive said side slip signal for providing said desired roll attitude signal with a roll attitude component as a function of aircraft side slip for driving the magnitude of said side slip signal to zero.

11. A helicopter integrated fire and flight control system according to claim 10 further comprising:

means responsive to said axis command signals for providing a desired attitude signal indicative of a desired aircraft attitude in said given attitude axis;

means for sensing the attitude of the aircraft in said given attitude axis and for providing an actual attitude signal indicative thereof;

means responsive to said desired attitude signal and to said actual attitude signal for providing an attitude feedback error signal as a function of the difference between said desired attitude signal and said actual attitude signal; and attitude feedback means responsive to the absence of said coupled aiming signal for providing control surface command signals to drive the magnitude of said attitude feedback error signal to zero for said given attitude axis, and responsive to the presence of said coupled aiming signal for respectively replacing said attitude feedback error signal for the yaw attitude axis, the pitch attitude axis and the roll attitude axis with said azimuth command signal, said elevation command signal, and said desired roll attitude signal.

12. A helicopter integrated fire and flight control system according to claim 11 further comprising:

means for sensing aircraft air speed and for providing an airspeed signal indicative thereof;

means responsive to said coupled aiming signal and said air speed signal being above a threshold magnitude for providing a coordinated turn initialization signal;

said turn coordination means being responsive to said initialization signal for providing turn coordination during operation of the flight control system in said coupled aiming mode, and responsive to the absence of said initialization signal for disabling turn coordination during operation of the flight control system in said coupled aiming mode.

13. A helicopter integrated fire and flight control system according to claim 12 further comprising:

control means operable by a pilot to provide axis command signals for controlling a given attitude axis of the aircraft;

inhibit logic means responsive to the simultaneous input of a right roll axis command signal and a left yaw axis command signal, or a left roll axis command signal and a right yaw axis command signal for providing an inhibit signal;

enable logic means responsive to the simultaneous occurrence of a right roll axis command signal and a positive side slip signal, or a left roll axis command signal and a negative side slip signal for providing an enable signal; and said turn coordination means being responsive to said inhibit signal for inhibiting turn coordination during operation of the flight control system in said coupled aiming mode, and responsive to the presence of said enable signal for re-enabling turn coordination during operation of said flight control system in said coupled aiming mode.

* * * * *